United States Patent
Safari et al.

(10) Patent No.: US 11,628,416 B2
(45) Date of Patent: Apr. 18, 2023

(54) GRAPHENE COATED GLASS MATERIAL AND USES THEREOF

(71) Applicants: Edwin Safari, Toronto (CA); Mohammad Tofigh Rayhani, Ottawa (CA)

(72) Inventors: Edwin Safari, Toronto (CA); Mohammad Tofigh Rayhani, Ottawa (CA)

(73) Assignee: Edwin Safari

( * ) Notice: Subject to any disclaimer, the term of this patent is extended or adjusted under 35 U.S.C. 154(b) by 71 days.

(21) Appl. No.: 16/627,940

(22) PCT Filed: Dec. 22, 2017

(86) PCT No.: PCT/CA2017/051592
§ 371 (c)(1),
(2) Date: Dec. 31, 2019

(87) PCT Pub. No.: WO2019/010561
PCT Pub. Date: Jan. 17, 2019

(65) Prior Publication Data
US 2021/0146332 A1    May 20, 2021

(51) Int. Cl.
| | | |
|---|---|---|
| *B01J 20/20* | (2006.01) | |
| *B01J 20/30* | (2006.01) | |
| *B01J 20/32* | (2006.01) | |
| *C02F 1/28* | (2006.01) | |
| *C02F 101/20* | (2006.01) | |
| *C02F 101/22* | (2006.01) | |
| *C02F 101/32* | (2006.01) | |

(52) U.S. Cl.
CPC ........... *B01J 20/20* (2013.01); *B01J 20/3078* (2013.01); *B01J 20/3204* (2013.01); *B01J 20/324* (2013.01); *B01J 20/3293* (2013.01); *C02F 1/281* (2013.01); *C02F 1/288* (2013.01); *B01J 2220/4806* (2013.01); *C02F 2101/20* (2013.01); *C02F 2101/22* (2013.01); *C02F 2101/327* (2013.01)

(58) Field of Classification Search
CPC .... B01J 20/20; B01J 20/3078; B01J 20/3204; B01J 20/324; B01J 20/3293; C02F 1/281; C02F 1/288
See application file for complete search history.

(56) References Cited

U.S. PATENT DOCUMENTS

| | | | |
|---|---|---|---|
| 2013/0209793 A1* | 8/2013 | Delgado Sánchez | B82Y 30/00 428/408 |
| 2014/0011034 A1* | 1/2014 | Majumder | C09K 8/805 428/404 |
| 2015/0232343 A1 | 8/2015 | Liu et al. | |

FOREIGN PATENT DOCUMENTS

CN    103962102 A    8/2014

OTHER PUBLICATIONS

Dubey et al., Journal of Water Process Engineering, (2015), 5, p. 83-94 (disclosed in IDS).*
Dubey et al., Journal of Water Process Engineering, (2015), 5, 83-94. (Provided by Applicant).*
Ding et al, Chemical Engineering Journal, (2014), 257, 248-252.*
Rafi et al, IOP Conf. Ser., Mater. Sci. Eng., 438, 012037 (2018).*
M.A. Barakat, New trends in removing heavy metals from industrial wastewater, Arabian Journal of Chemistry, 4, (2011) 361-377.
Wang et al., Advances in Colloid and Interface Science, 195-196 (2013) 19-40.
Dubey et al., Journal of Water Process Engineering (2015) 5, 83-94.
Gupta et al., ACS Appl. Mater. Interfaces 2012, 4, 4156-4163.
Ding et al., Chemical Engineering Journal, 257, (2014) 248-252.
Gao, Graphite Oxide Structure Reduction and Applications (2012).
Canadian Intellectual Property Office, Written Opinion of the International Searching Authority, Application No. PCT/CA2017/051592, dated Feb. 13, 2018.

* cited by examiner

*Primary Examiner* — Yong L Chu
(74) *Attorney, Agent, or Firm* — Daniel C. Pierron; Widerman Malek, PL

(57) ABSTRACT

A graphene coated crushed glass particle adsorbent is provided for the removal of heavy metals and other contaminants in from solutions such as wastewaters, contaminated surface water and groundwater. The adsorbent comprises crushed (e.g. recycled) glass coated with graphene nanosheets using a staged thermal binding process and the silicas in the glass as a catalyst. The adsorbent may be configured for use in both in-situ and ex-situ treatment systems and is capable of removing heavy metals and other inorganic and organic contaminants. The strong adsorptive bond between contaminants and the graphene coating on crushed glass particles can also lead to alternative applications of the end of life adsorbent, such as base material in road and pavement (e.g. cement-like) construction materials.

27 Claims, 27 Drawing Sheets

Table 1 – Sample chemical composition of GCGPs

| Sample description | Carbon (%) | Oxygen (%) | Silicon (%) |
|---|---|---|---|
| 0.25 mm, %150 sugar/recycled glass | 63.7 | 22.4 | 5.2 |
| 0.25 mm, %150 sugar/recycled glass | 76.7 | 19.6 | 2.3 |
| 0.425 mm, %150 sugar/recycled glass | 81.6 | 13.3 | 3.5 |
| 0.425 mm, %150 sugar/recycled glass (2 hours at 450°C) | 72.1 | 23.5 | 2.4 |

Figure 15

TABLE 2: Spectrum Processing

Peak possibly omitted : 3.720 keV

| Element | Weight % | Atomic % |
|---|---|---|
| C K | 74.97 | 83.51 |
| O K | 19.02 | 15.91 |
| Si K | 0.43 | 0.21 |
| Au M | 5.57 | 0.38 |
| Totals | 100.00 | |

TABLE 3 - Spectrum Processing

No peaks omitted

| Element | Weight % | Atomic % |
|---|---|---|
| C K | 71.67 | 83.52 |
| O K | 17.79 | 15.56 |
| Na K | 0.32 | 0.19 |
| Au M | 10.22 | 0.73 |
| Totals | 100.00 | |

TABLE 4: Spectrum Processing
Peak possibly omitted: 6.400 keV
| Element | Weight % | Atomic % |
|---|---|---|
| C K | 71.20 | 81.17 |
| O K | 20.52 | 17.56 |
| Na K | 0.48 | 0.29 |
| Si K | 0.87 | 0.43 |
| Ca K | 0.28 | 0.10 |
| Au M | 6.64 | 0.46 |
| Totals | 100.00 | |
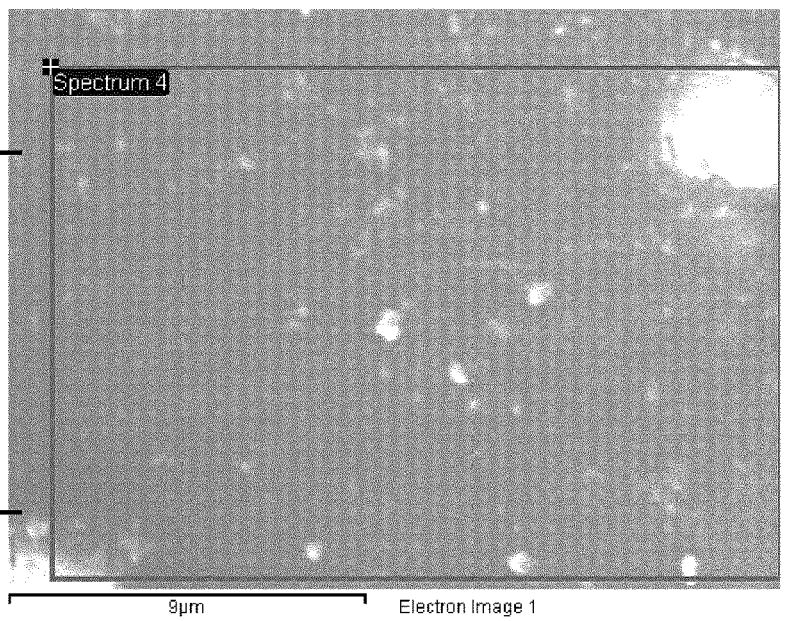
Figure 18
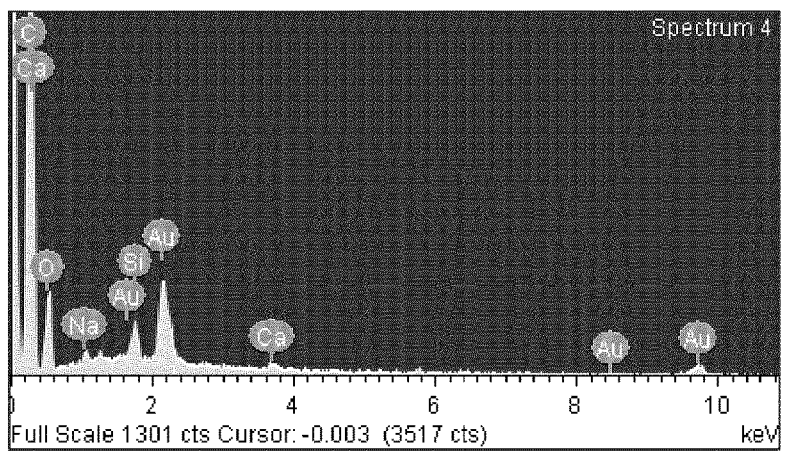

TABLE 5: Spectrum Processing
No peaks omitted
| Element | Weight % | Atomic % |
|---|---|---|
| C K | 66.95 | 79.33 |
| O K | 19.07 | 16.96 |
| Si K | 1.51 | 0.77 |
| Ca K | 7.20 | 2.56 |
| Au M | 5.27 | 0.38 |
| Totals | 100.00 | |
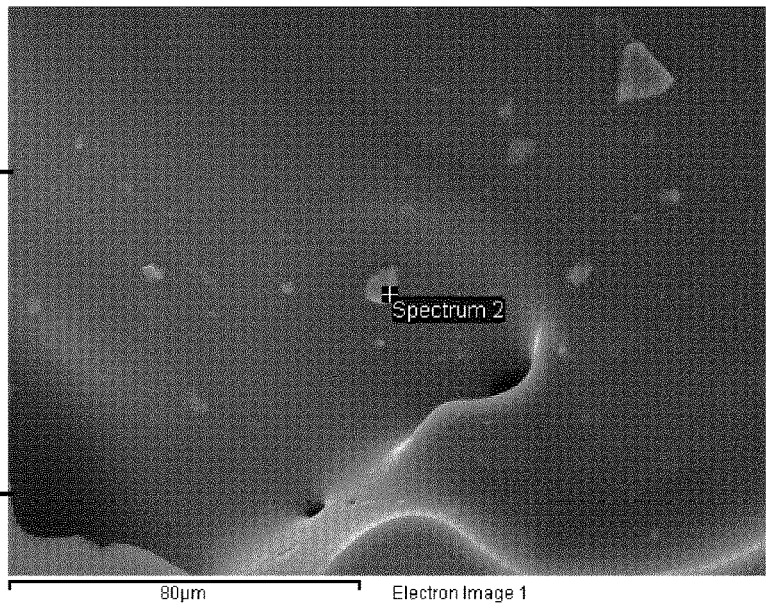
Figure 19
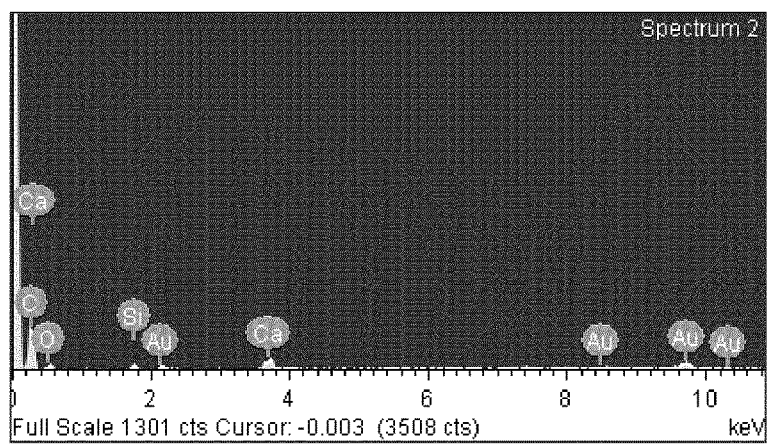

TABLE 6: Spectrum Processing:

No peaks omitted

| Element | Weight % | Atomic % |
|---------|----------|----------|
| C K     | 68.52    | 78.81    |
| O K     | 21.81    | 18.83    |
| Na K    | 0.70     | 0.42     |
| Mg K    | 0.23     | 0.13     |
| Si K    | 2.38     | 1.17     |
| Ca K    | 0.43     | 0.15     |
| Fe K    | 0.41     | 0.10     |
| Au M    | 5.52     | 0.39     |
| Totals  | 100.00   |          |

TABLE 7: Spectrum Processing:
No peaks omitted
| Element | Weight % | Atomic % |
|---------|----------|----------|
| C K     | 64.25    | 78.09    |
| O K     | 18.56    | 16.93    |
| Na K    | 1.13     | 0.72     |
| Mg K    | 0.36     | 0.22     |
| Si K    | 5.65     | 2.94     |
| Ca K    | 1.25     | 0.46     |
| Au M    | 8.80     | 0.65     |
|         |          |          |
| Totals  | 100.00   |          |
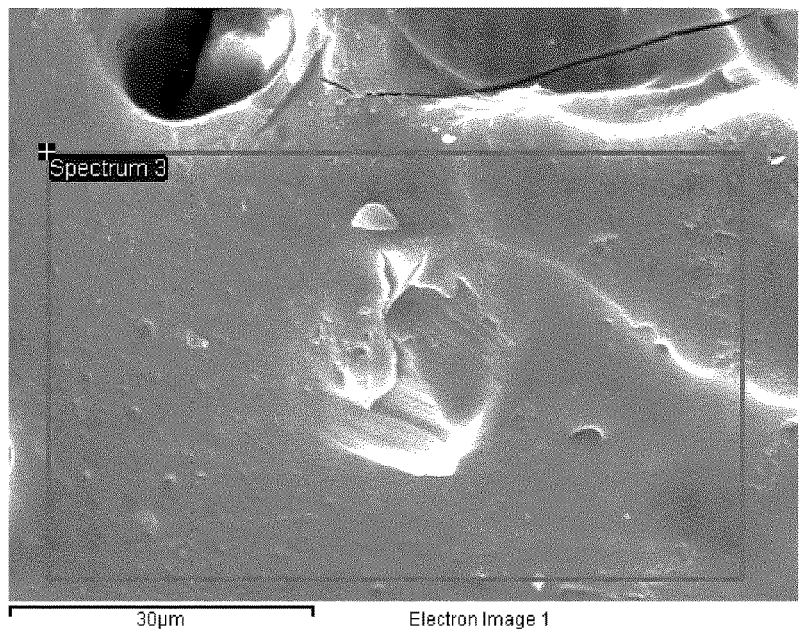
Figure 21
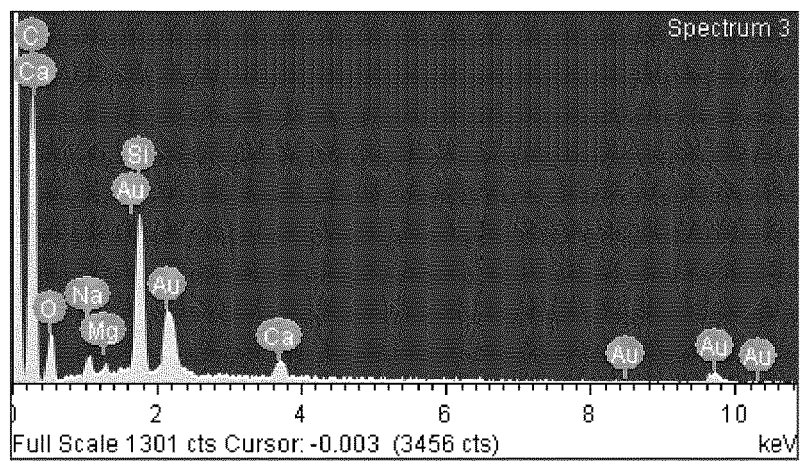

Table 8: Adsorption of BTEX and TCE by GCGPs

|  |  | Initial concentration | Mass of GCGPs | | | | |
|---|---|---|---|---|---|---|---|
|  |  |  | 0.5g | 1g | 2g | 3g | 5g |
| Benzene | µg/L | 562 | 64.4 | 49 | 21.1 | 9.4 | 3.8 |
| Toluene | µg/L | 554 | 19.9 | 13.3 | 5.4 | 2.6 | 1.2 |
| Ethylbenzene | µg/L | 528 | 9.5 | 6.6 | 2.6 | 1.4 | 0.7 |
| Xylene, m,p- | µg/L | 1050 | 16.7 | 11.9 | 4.3 | 2.2 | 1.1 |
| Xylene, o- | µg/L | 585 | 20.1 | 14.1 | 3.8 | 1.7 | 0.7 |
| Xylene, m,p,o- | µg/L | 1640 | 36.7 | 25.9 | 8.1 | 3.9 | 1.9 |
| TCE | µg/L | 7.8 | <0.1 | <0.1 | <0.1 | <0.1 | <0.1 |
| TCE | µg/L | 494 | 21.9 | 14 | 5.9 | 3.8 |  |

Figure 26

GRAPHENE COATED GLASS MATERIAL AND USES THEREOF

FIELD OF THE INVENTION

The present invention relates to graphene coated glass materials, methods of manufacture of such materials and their use in filtration systems for the decontamination of contaminated waters, industrial wastewaters, landfill leachates and mine drainage.

BACKGROUND OF THE INVENTION

Heavy metals, many of them being toxic to ecosystems and human health are introduced to soil and aquatic systems and enter the food chain through a variety of sources of mostly industrial nature. Major sources of heavy metal emission in Canada include acid mine drainage (AMD) from mining industry, process wastes and wastewaters and accidental spills in oil and gas sector and metal manufacturing industry among others. Strict environmental regulations and standards are typically met by industries through technically and technologically challenging and costly wastewater treatment systems.

Other contaminants categorized as organic compounds such as trichloroethylene, tetrachloroethylene, Benzene, Toluene, Ethylbenzene and Xylene (known as BTEX) and petroleum hydrocarbons among others are typical contaminants found in water and wastewaters from various industrial activities such as petroleum production and processing and chemical industries.

A number of conventional physical and chemical processes have been practiced and applied to remove heavy metals and organic contaminants from various types of wastewaters and other contaminated water, including, but not limited to physical separation processes, reverse osmosis, adsorption and chemical precipitation to name a few (Wang et al., Advances in Colloid and Interface Science 195-196 (2013) 19-40). In most cases, however, conventional methods for heavy metal removal are prone to be costly and generate by-products in the form of sludge, concentrated effluents and/or hazardous solid waste. These issues can add to the capital and operational costs of a treatment system as well as associated environmental burdens.

Organic compounds require sophisticated methods to be removed from contaminated aqueous solutions. Chemical methods typically result in large volumes of sludge with concentrated levels of toxic substances, and physical separation techniques such as reverse osmosis generate large volumes of reject water with higher concentration of toxic contaminants. Both of these existing methods are highly chemical and energy demanding.

Adsorption of heavy metals and organic compounds onto various types of natural and synthetic adsorbents has also been practiced. The main drawbacks of these methods are limited adsorptive capacities and sensitivity to environmental factors and wastewater properties, resulting in the need for frequent backwash and regeneration of the adsorbent. In addition, service life of commercially available adsorption systems is relatively short.

Graphene based materials have been used for the removal of heavy metals including but not limited to arsenic, lead, chromium, cadmium, nickel and organic compounds such as Bisphenol A, Rodamine B, red cationic dyes and Tetracycline antibiotics. Graphene based materials alone, however, if used in treatment systems can be transported in water and porous media and can be potentially hazardous to human health and the environment. Therefore, methods suggesting the application of free graphene in aqueous solutions within treatment systems are prone to the release of this potentially toxic material to the environment.

One way to address this deficiency has been to coat sand with graphite oxide (GO) as disclosed in U.S. Patent Publication No. 20140011034, wherein GO is first prepared according to a modified Hummers method, dispersed in water and then physically mixed with sand particles while heating to temperatures of up to 150° C. in a vacuum. The attachment of graphite oxide to the sand particles is likely through van der Waals bonding and was batch tested for its capacity to absorb mercury ions and some organic contaminants. No information is provided regarding the long term performance of the graphite oxide coated sand particles.

Similarly, using sand as a substrate, Dubey et al. (*Journal of Water Process Engineering* 5 (2015) 83-94, and Gupta et al. (*ACS Appl. Mater. Interfaces* 2012, 4, 4156-4163) have reported graphitization of sand, wherein after mixing the sand in a sugar solution at a low temperature for 6 hrs until dry, the mixture is then heated in stages, including a high temperature stage (400° C. and 750° C., respectively) to promote graphitization. Graphitization of sugar requires both elevated temperatures and a catalyst. In this case, $SiO_2$ acts as a catalyst leading to the formation of SiC, such that carbon atoms get attached to SiC and $SiO_2$. This can result in the formation of a stack of carbon caps on the initial layer of carbon which reduces the contaminant absorbance efficiency.

The focus using graphene oxide on a sand substrate for the purification of contaminated solutions is due to the functional groups which make graphene oxide well suited for heavy metal (Ding et al., *Chemical Engineering Journal* 257 (2014) 248-252) and organic compound adsorption (Gao et al., U.S. Patent Publication No. 20140011034). The emphasis in the art on graphene oxide as an adsorbent material is also related to the propensity of graphene sheets to fold and aggregate which can reduce adsorptive performance (Wang et al.). Accordingly, the focus in this field has been on the chemical composition and layering thickness of graphene nano-sheets on substrates, such as sand. Little, if any innovation in this field has been presented with respect to engineering different three-dimensional (3D) graphene structures on substrates for use in water purification.

There remains a need, however, to provide for alternative carbon-based filters, filtration bed materials and filtering systems applicable in a wide range of environmental practice areas for the removal of a variety of inorganic and organic contaminants from water based solutions, and methods for producing same.

SUMMARY OF THE INVENTION

It is an object of the invention to provide graphene coated crushed glass materials which can be used for the adsorption of heavy metals and other inorganic and organic contaminants from solutions. A staged, thermal process for chemically growing and binding single and multiple graphene nano-sheets to a glass substrate to form 3D graphene structures is applied, wherein $SiO_2$ (from the silica content in crushed glass) acts as a catalyst and thermal bonding is achieved at temperatures up to about 450° C. The high specific surface area of the resulting graphene coated crushed glass particles and option to customize (e.g. functionalize) the characteristics and properties of the coatings enables the detoxification of contaminated solutions when the graphene coated crushed glass materials are used in filters, filtration beds and related filtering systems.

According to one aspect, there is provided an adsorbent comprising a plurality of crushed glass particles coated with graphene (GCGPs).

In an embodiment, the plurality of particles comprises graphene chemically bound to the surface of crushed glass particles. The graphene coated on the crushed glass particles may be in the form of monolayers, multilayers, and/or 3D structures (graphene outcroppings), and comprise coating thicknesses on a nanometer scale.

In another embodiment, about 50% to about 95% of the total surface of the plurality of particles is coated with graphene. In a further embodiment, over about 95% of the total surface of the plurality of particles is coated with graphene.

In yet another embodiment, the crushed glass particles used to produce the GCGPs comprise silica content ranging from about 35% to about 95%. In a related embodiment, the silica content of the crushed glass particles ranges from about 73% to about 74%. In a further embodiment the crushed glass particles comprise recycled glass.

In another embodiment, the plurality of particles comprises functionalized graphene.

In still a further embodiment, the plurality of particles has a grain size of about 0.01 mm to about 2 mm. In a related embodiment, the plurality of particles has a grain size of up to about 0.5 mm.

In one embodiment, the adsorbent comprising GCGPs is a component of a filter unit.

According to another aspect, there is provided a method of coating crushed glass particles with graphene, comprising the steps of stirring crushed glass particles in a sugar solution to form a mixture and heating the mixture in stages to thermally bind graphene to the surface of crushed glass particles and form graphene coated crushed glass particles. The crushed glass particles may be sourced from recycled glass.

In an embodiment, the mixture is stirred continuously throughout all heating stages.

In another embodiment, the heating stages comprise a low temperature, medium temperature and high temperature stage.

In still another embodiment, the high temperature heating stage is conducted at a temperature in the range of about 350° C. to about 750° C. In a related embodiment, the high temperature heating stage is conducted at a temperature of about 450° C.

In a further embodiment, the method further comprises the steps of cooling and activating the graphene thermally bound to the crushed glass particles.

In yet another embodiment the crushed glass particles are recycled glass.

According to a further aspect, there is provided a process for detoxifying a contaminated solution comprising the step of contacting the contaminated solution with an adsorbent comprising graphene coated crushed glass particles.

In one embodiment, the contaminated solution is an aqueous solution comprising inorganic contaminants. In a related embodiment, embodiment, the contaminated solution comprises heavy metals. In still another related embodiment, the contaminated solution comprises Pb, Cd and/or Cr. In a further embodiment, contaminated solution comprises Hg.

In still a further embodiment, the adsorbent substantially detoxifies a contaminated solution with Pb, Cd and/or Cr; for example, where each present in concentrations of about 10 ppm or less. In a related embodiment, Cr in the form of Cr (VI) is converted to Cr (III) upon contacting the adsorbent. In another related embodiment, the adsorbent substantially detoxifies a solution contaminated with Hg.

In another embodiment, the contaminated solution is an aqueous solution comprising organic contaminants. In a related embodiment, the contaminated solution comprises PAHs. In still another related embodiment, the contaminated solution comprises naphthalene, phenathren and/or acenaphthen. In a further embodiment, the contaminated solution comprises benzene, toluene, ethyl benzene and/or xylene (BTEX). In yet another embodiment, the contaminated solution comprises trichloroethylene (TCE). In still another embodiment, the contaminated solution comprises perchloroethylene (PCE).

In still another embodiment, the adsorbent substantially detoxifies a contaminated solution with organic compounds, such as PAHs (e.g. naphthalene, phenathren and/or acenaphthen); for example wherein each contaminant is present in concentrations about 1 ppm or less. In another embodiment, the adsorbent substantially detoxifies a solution contaminated with BTEX, TCE and/or PCE.

In one embodiment, the adsorbent is configured as a filter unit for ex-situ use.

In another embodiment, the adsorbent is configured as a filter unit for in-situ use.

According to another aspect, there is provided use of an end of life adsorbent comprising a plurality of graphene coated crushed glass particles as a constituent of cement-like construction materials. The materials may be used to construct roads and/or pavements.

BRIEF DESCRIPTION OF THE DRAWINGS

The features and advantages of the invention will be apparent and better understood by reference to the following detailed descriptions when considered in connection with the accompanying figures, wherein:

FIG. 15: Table of sample chemical compositions of GCGPs in terms of the percentage of carbon, oxygen and silicon.

FIG. 18: Chemical analysis (Table 4 and Spectrum 4) of region of GCGPs represented in FIG. 22 and more particularly from spectrum area of SEM image (sample 24 #40-60 75% eds 4).

FIG. 19: Chemical analysis (Table 5 and Spectrum 2) of region of GCGPs represented in FIG. 22 and more particularly from spectrum area of SEM image (sample 24 #40-60 75% eds 5).

FIG. 21: Chemical analysis (Table 7 and Spectrum 3) of region of GCGPs represented in FIG. 22 and more particularly from spectrum area of SEM image (sample 24 #40-60 75% eds 7).

FIG. 26: Batch adsorption testing results for BTEX and TCE using GCGPs represented in FIG. 22.

DETAILED DESCRIPTION OF THE INVENTION

Figure 1:
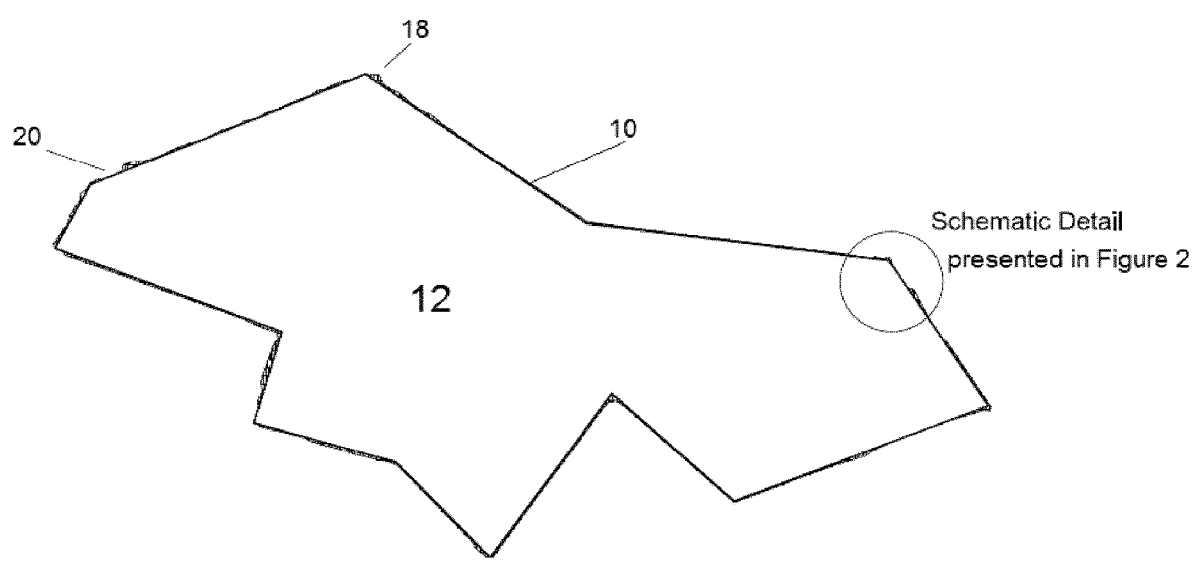
FIG. 1: is a simplified (schematic) view of graphene sheets coated on the perimeter of a crushed glass particle according to the present disclosure.

The present disclosure relates to materials with significant adsorptive and decontamination capacity and related filtering systems, made by coating graphene nano-sheets or layers onto the surface of crushed glass and glass-like particles of different compositions, varieties, shapes and sizes.

The various aspects, design factors, construction and use of the invention disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use, process or method, denotes that additional elements and/or method steps may be present, but that these additions do not materially affect the manner in which the recited composition, device, article, system, process, method or use functions.

The term "consisting of" when used herein in connection with a composition, device, article, system, use or method, excludes the presence of additional elements and/or method steps. A composition, device, article, system, use, process or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "adsorb", "adsorbed" and "adsorption" refer to the adhesion of molecules (adsorbate) in a solution to a surface of a solid body (adsorbent) upon contacting the adsorbent with the solution. Typically, adsorption occurs over a limited period of time due to the affinity of the adsorbent for the target adsorbate(s) of a solution. It is understood that adsorption in the context of the present disclosure may arise by way of both physical and chemical sorption.

As used herein, the terms "deposited," "depositing" and "deposition," refer to any direct or indirect physical or chemical association between graphene (or graphene derivative) and another surface, such as the surface of a graphene layer or surface circumference of a crushed glass particle substrate. Graphene deposited to the surface/circumference of crushed glass particles may be, for example, associated by way of van der Waal forces or chemically bonded to the silica of a glass surface. It is understood that association between graphene and a glass surface may be achieved by way of intervening graphene deposits e.g. (caps, clots or layers), chemical groups as a result of chemical modifications to the graphene or substrate surface (functionalization), or intercalation of other chemical entities. The depositing of graphene may also result in different configurations and formations of graphene (outcroppings) on a surface, including but not limited to the crystallization or growth of various 3D structures extending outward from the surface, such as sheets (flakes), pellet, tubular, spiked and web-like structures.

As used herein, the terms "detoxify," "detoxification," "detoxified," "decontaminate" and "decontaminated" refer to the removal, or chemical conversion of contaminants (undesired chemical constituents/entities) in a solution, or otherwise to the purification or conversion of a contaminated solution into a liquid that is safe, according to industrially/commercially accepted, or prescribed standards for a desired application, such as release into the environment. It is understood that a detoxified or decontaminated solution is not necessarily 100% free of contaminants. Detoxified or decontaminated solutions may also comprise solutions in which a given contaminant is no longer detectable. The applied process by which contamination solutions are detoxified or decontaminated includes, but is not necessarily limited to the application of GCGPs according to the present disclosure.

As used herein, the term "glass", "glass-like" or "glass particles" refers to silica based materials which have been naturally formed (e.g. through lightning and volcanic activity), or industrially or commercially manufactured using sand and other additives (fluxes, stabilizers and colorants) such as, but not limited to various oxides and carbonates of sodium, calcium, potassium, magnesium, lead, boron, barium, aluminum, titanium, iron, manganese, cadmium and cobalt, with the resulting glass containing from about 35% to about 95% silica. Glass particles may be obtained either directly from glass manufacturers, or as derived from glass collected for recycling, for example, from man-made (e.g. municipal) solid waste streams. The most common type of readily available and cost effective glass is soda-lime-silica glass which comprises about 73-74% silica.

As referred to herein, the term "graphene" means single layer, multi-layers or clots of $sp^2$ carbon atoms, wherein in each layer, carbon atoms are bonded to each other in a honeycomb (hexagonal) lattice formation. The term "bare graphene" is used to distinguish layers or areas of graphene coatings which are substantially carbon only, and as such chemically distinguishable from "graphene oxide" or "graphite oxide" (GO) which is a soluble or liquid dispersible derivative of graphene in which certain carbon atoms are bound to oxygen atoms. A graphene nano-sheet or layer is a one atom honeycomb layer of carbon (graphene). Multiple layers of graphene may be applied according to the present disclosure to a substrate surface/circumference to form coatings ranging in thickness from a hundreth of a nanometer (e.g. about 0.01 nm) to micrometer scale (e.g. about 1.50 μm). Additionally, graphene may be formed and grown over glass as the base material (with or without intervening graphene layers) in such a manner so as to form various 3D structures, including various formations of outcroppings (e.g. spikes, cylindrical/tube-like, pellet and flake/sheet-like formations) extending from the surface of a glass particle or base layer of graphene (carbon) formed on the surface of the glass particle.

As used herein, reference to "crushed glass", "crushed glass particles" or "crushed recycled glass" refers to a collection of irregularly shaped glass particles. Glass particles can have a wide range of sizes as may be found in solid waste streams or further processed to provide for a more homogeneous size mixture of particles.

As used herein, the terms, "filter" and "filtration" when used in relation to graphene coated (crushed) glass particles refers to removing (by adsorption) contaminant ions or molecules of various sizes and types (e.g. organic, inorganic, including heavy metals) from solutions. Alternatively, the contaminant (be it organic or inorganic) when dissolved in a liquid is contacted with graphene coated (crushed) glass particles for the solution to be decontaminated or detoxified according to the present disclosure.

As used herein, the term "graphene coated (crushed) glass" or "graphene coated (crushed) glass particles" refers to plurality of glass particles wherein a part of the total crushed glass surface area is covered with graphene. Depending on the intended application a 10% surface coverage may provide functionally adsorbent graphene-glass composites given that graphene deposited on the surface of glass particles according to the present disclosure has a three dimensional structure and the overall surface area of graphene (where actual adsorbance occurs) can be orders of magnitude greater than a flat surface of graphene on glass particle. When using the process according to the present disclosure to prepare graphene coated glass particles coverage of over 50% to over 95% of the crushed glass circumference (surface) area can be achieved.

As used herein, the terms "low", "moderate" and "high" as applied to temperature references mean the following ranges: up to about 100° C. (low), greater than about 100° C. to about 200° C. (moderate) and greater than 200° C. to less than about 350° C. (high). Temperatures greater than about 350° C. and higher are defined herein as "very high". The methods according to the present disclosure are intended to be carried out at temperatures up to about 450° C. to bond graphene layers to a selected glass or glass-like substrate, and for limited periods of time to minimize the formation and stacking of carbon caps on the graphene layers.

As used herein, the term "sand" refers to naturally occurring silicas found in sedimentary materials, comprising primarily quartz silicas, but which may or may not include a certain amount of other materials such as minerals (e.g. feldspar), lithic fragments and biogenic materials.

As used herein, the term "solution(s)" includes any liquid which contains two or more components and may include aqueous, organic and mixed liquid solutions, e.g. combinations of miscible aqueous and organic solvents, arising or made by the dissolution of one component into or throughout another. When a solution is qualified as a "waste solution(s)", or "contaminated solution(s)", the solution contains at least one dissolved component detectably present in sufficient amounts to be considered an undesirable constituent (chemical entity) of the solution for its intended application, such as for release into the environment. Examples of contaminated solutions include wastewaters, drainage, leachates and other industrial effluents, human and animal sewage or liquid waste streams, solution intermediates and liquid by-products arising in a variety of contexts such as, but not limited to, industrial manufacturing, agricultural practices, food processing, mining, oil and gas extraction and municipal waste water treatment plant operations.

As used herein, the term "sugar" or "sugars" refers to carbohydrate compounds including but not limited to glucose, fructose, sucrose and polysaccharides such as starch. The terms also refers to compounds generally comprising a C:H:O ratio of 1:2:1, or made up of one or more subunits comprising the general formula Cn(H2O)n. "Simple" sugars as referred to herein refer to monosaccharide and disaccharide sugar compound structures. It would be understood by one skilled in the art that the bonding of one more sugar subunits to form a multi-unit or polysaccharide compound structure such as starch entails chemical modification resulting in the loss of H2O. To function as suitable sources of carbon for the production of graphene according the present disclosure, H and O in the sugar compounds must be in forms that can dehydrate under hydrothermal conditions (e.g. of hydroxyl, carboxyl or carbonyl groups) and may include substituted or derivatized sugars.

As used herein, the terms "functionalize," "functionalized", or "functionalization" refers to processes and the result of adding, substituting, or modifying chemical groups, or at a graphene layer once bonded to a substrate surface according to the present disclosure, in order to modify the adsorptive and decontamination capacity of graphene coated crushed glass particles.

It is contemplated that any embodiment discussed herein can be implemented with respect to any disclosed process, method, use, apparatus or system, and vice versa. Furthermore, an apparatus and/or system of the invention can be used to achieve the disclosed methods and uses.

It is understood that reference to various embodiments of the invention in the present disclosure, including those depicted in the Figures are illustrative and are not intended to limit the scope of the invention in any way.

Graphene Coated (Crushed) Glass Particles (GCGPs)

The present disclosure provides graphene nano-sheets (optionally functionalized) coated or deposited on the exterior of crushed glass particles in order to make GCGPs, which have the capacity to adsorb a wide range of contaminants in aqueous (aquatic) and other solutions.

Using glass or glass-like particles as a substrate to construct GCGPs, instead of sand as previously known in the art, provides several advantages compared to sand including, among other things, economic benefits in relation to waste and contaminated water treatment field applications.

When applying a thermal process of chemically binding carbon to silica, crushed glass has a greater proportion of silica readily available for binding with carbon. This can potentially lead to less energy consumption in the thermal process and provide stronger bonding and a more energy efficient system.

The option to use recycled glass reduces the environmental burden associated with glass disposal and environmental burden or disruption of extracting sand for industrial uses.

The angular and larger surface area of crushed glass compared to the mainly round structure of sand particles results in a larger surface area both for coating and for the adsorption of contaminants.

Another advantage is the lower density of crushed glass compared to sand so as to provide for lighter adsorptive filtration beds and systems.

A further advantage is the possibility of engineering a variety of 3D graphene structures to provide for improved and/or customized adsorption capacities.

In one embodiment, the GCGPs comprise clear glass. In another embodiment, the GCGPs comprise coloured glass. In a related embodiment, the GCGPs comprise recycled glass (e.g. from municipal solid waste streams).

In a further embodiment, the GCGPs have a particle or grain size of about 0.01 mm to about 3.00 mm. In a related embodiment, the grain size is up to about 0.5 mm.

In still another embodiment, the GCGPs have a silica content ranging from about 35% to about 95% silica. In a related embodiment, the GCGPs have a silica content ranging from about 73-74%.

The composition and structure of GCGPs according to the present disclosure, is schematically shown in FIG. 1. Graphene nano-sheets 10 which may be made or derived from naturally available or synthetic hydrocarbons including simple sugars such as glucose, fructose, and sucrose, as well as polysaccharides such as starch and the like, are coated onto crushed (recycled) glass 12 of various colors, shapes and sizes as may be available from commercial sources or solid waste streams. Prior to use, the glass particle(s) 12 is washed with water and/or organic solvents such as dichloromethane to remove attachments and printed labels. In some cases weak acid solutions such as hydrochloric acid can be used.

Figure 2:
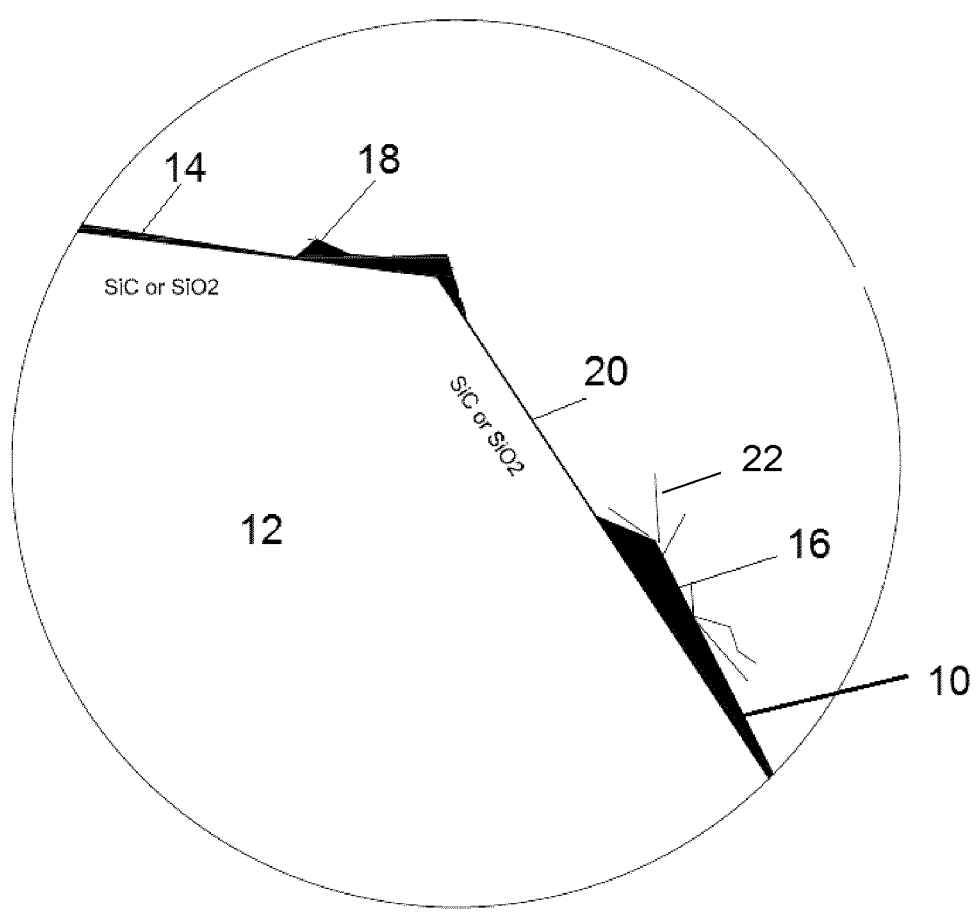
FIG. 2: shows the graphene sheet coating detail on the perimeter of the crushed glass along with a coating configuration with reference to FIG. 1.

Referring to FIG. 2 there is shown a more detailed schematic of graphene 10 coated on the exterior surface of the glass particle 12, as made using a staged thermal process aimed at achieving graphene-glass nanocomposite where single layer or multilayer sheets of graphene coating 10 are deposited and bound, directly or indirectly through intermediary graphene layers, to crushed glass particles 12 using the catalytic effect of the silica content of the crushed glass 12. Illustrated in FIG. 2 are also the details of graphene monolayer 14 or multi layers 16 or clots of $sp^2$ carbon atoms 18 with uncoated region 20. When using the methods according to the present disclosure to make GCGPs, greater than 90% of glass surface area may be coated. Put otherwise, the uncoated area 20 remaining may be less than 10% of the crushed glass 12 circumference areas.

Figure 3:
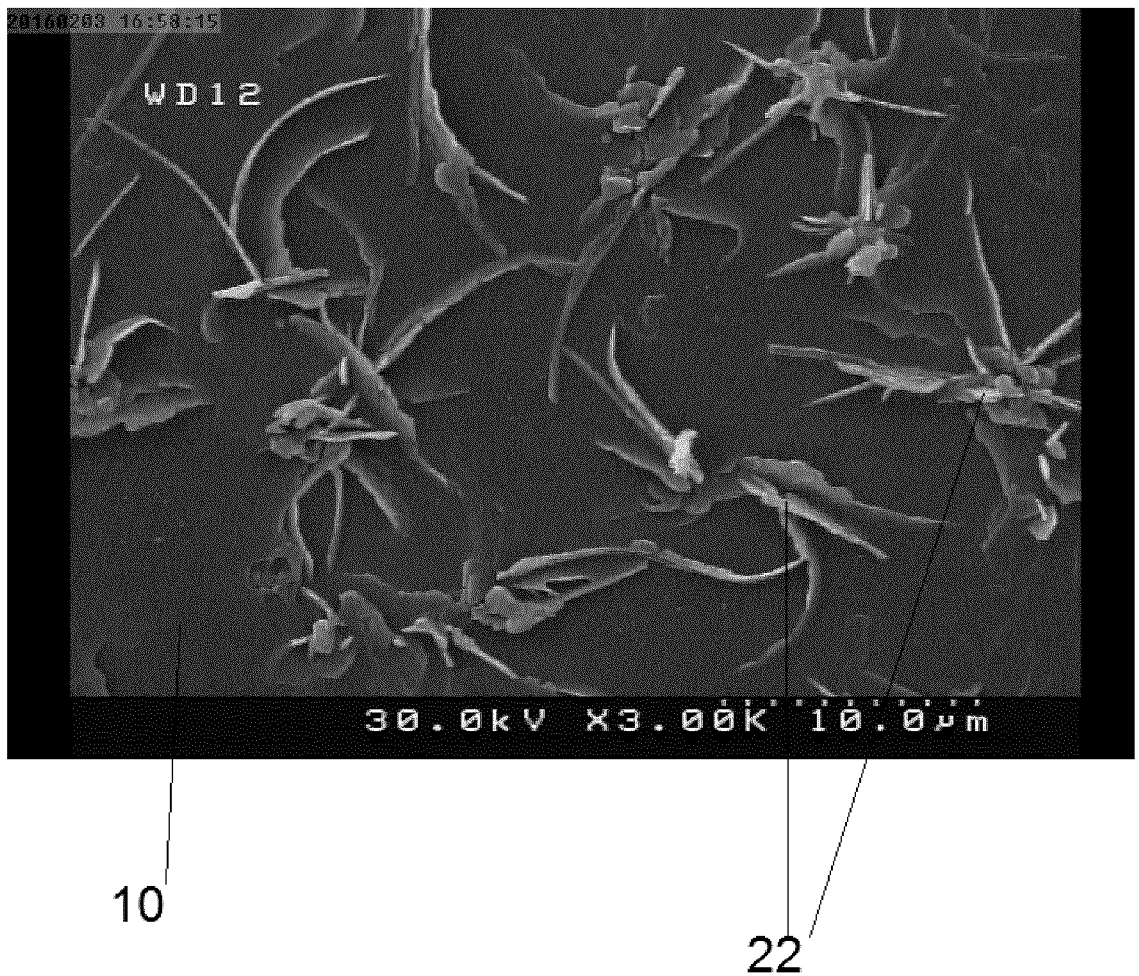
FIG. 3: is a sample scanning electron microscope (SEM) image of the graphene layers in a coating on a glass particle perimeter.

With reference to FIG. 3, a scanning electron microscope (SEM) image of the coated area on GCGPs demonstrates that a relatively uniform distribution of star shaped graphene layers 22 (outcroppings) are formed with a thickness of less than 500 nm perpendicular to the graphitic surface 10 formed over glass particles 12.

As shown in FIG. 2 there is no apparent carbon capping, and the base surface (which covers the glass surface) is a platform for the growth of graphene nano-sheets vertically and laterally. Whether or not there is carbon capping, the presence of relatively long (in microns) sheets of graphene (with a nano scale thickness) aligned laterally, vertically, or at other angles, in outcrop formations 22 relative to the surface of the glass is indicative of a preparation of GCGPs with an adsorbance capacity according to the present disclosure.

In one embodiment, the GCGPs comprise graphene monolayers deposited onto the surface of crushed glass particles. In another embodiment, the GCGPs comprise graphene multilayers deposited onto the surface of crushed glass particles.

In yet another embodiment, the GCGPs comprise graphene formed onto the surface of crushed glass particles in outcrop formations, generally on a carbon base. An outcrop formation may comprise spike, web, tubular, pellet and/or flake configurations. In a related embodiment, the outcrop formations have thicknesses of about 200 nm or less.

In yet another embodiment, an amount of GCGPs comprise a total crushed glass surface area of which about 50% to about 95% is covered with graphene. In yet a further embodiment, over 95% of the total surface area of an amount of crushed glass particles is covered with graphene. In a related embodiment, the GCGPs comprise graphene coatings of a substantially uniform thickness on the surface of crushed glass particles. In still another related embodiment, the thickness of graphene coatings is less than about 500 nm.

In a further embodiment, GCGPs comprise graphene chemically bonded to the surface of crushed glass particles. In a related embodiment, GCGPs comprise activated graphene chemically bonded to the surface of crushed glass particles.

In another embodiment, the GCGPs are functionalized. In a related embodiment, the graphene deposited onto the surface of crushed glass particles is functionalized.

In another embodiment, GCGPs comprise graphene deposited onto the surface of crushed glass particles such that no detectable free graphene is present following sonication of the GCGPs in an ultrasonic bath for over an hour.

Process for Coating Glass Particles with Graphene

The graphene coatings are made from naturally available or synthetic hydrocarbons coated or deposited onto crushed recycled glass of various colors, shapes and sizes available from solid waste streams using a thermal binding process. To provide for a graphene based filter system which can safely remove toxic contaminants from solutions, such as wastewaters and leachates, graphene is coated onto the surface of particles of crushed glass and used as an adsorptive filter rather than as a suspended adsorbent within a given waste water treatment system. A thermally driven coating process and system is used to immobilize graphene layers to a glass particulate substrate, wherein graphene carbon atoms are chemically bonded to the glass substrate. The $SiO_2$ in the glass acts as a catalyst in the process and sugars are used as a source of carbon to make, deposit (thermally bind and layer) graphene onto the substrate material.

Instead of using chemical binders or sustained very high temperatures with catalysts, the process for producing GCGPs disclosed herein is a simplified yet highly effective thermal technique adapted from the method disclosed by Tang, L.; Li, X.; Ji, R.; Teng, K. S.; Tai, G.; Ye, J.; Wei, C.; Lau, S. P. (2012). "Bottom-up synthesis of large-scale graphene oxide nanosheets". *Journal of Materials Chemistry* 22 (12): 5676.). As adapted, the process provided herein results in the in situ thermal chemical binding of graphene directly to the silica in glass particles using natural hydrocarbon sources (sugars) at temperatures not exceeding a maximum temperature ($T_{max}$) of up to about 750° C. Accordingly, the simplified process disclosed herein eliminates the need for subsequent chemical reduction from graphene oxide to graphene and additional steps to transfer and anneal graphene sheets to a selected substrate. It is noted that while reduction of graphene oxide to graphene is possible, it is well known in the art that the resulting graphene product has residual oxygen and structural defects, which can impact the adsorptive capacity of graphene prepared from the reduction of GO for its intended purpose.

In one embodiment, a process for making GCGPs comprises the steps stirring a mixture of crushed glass particles in a sugar solution and heating the mixture in stages. In another embodiment, the process comprises a low, medium and high temperature stage. The low temperature stage is used to coat the glass particles with the sugar solution and attain a dry mixture. The medium temperature stage promotes an even coating of the surface (circumference) of particles as the sugars melt (e.g. sucrose melts at about 186° C.). The high temperature stage promotes the graphitization of the sugar to graphene and formation of the graphene-glass nanocomposites.

In still another embodiment, the high temperature stage of the process is conducted at a maximum temperature of about 350° C. In yet another embodiment, the high temperature stage of the process is conducted at a maximum temperature of about 400° C. In a further embodiment, the high temperature stage of the process is conducted at a maximum temperature of about 450° C.

In one embodiment, the retention time of the high temperature stage is about one hour at 450° C. In another embodiment, the retention time of the high temperature stage is about one to two hours at 350° C.

In another embodiment, the graphene coating on crushed glass particles is activated with concentrated sulphuric acid. Activation results in the removal of impurities and loose graphene, and thereby opens up space at the graphene sheets at a nano or micro scale to achieve a larger active surface for adsorption.

In a further embodiment the presence of graphene clots is minimized by varying the process parameters.

In still a further embodiment, the process for making GCGPs is carried out under neutral atmospheric conditions (e.g. nitrogen or vacuum). This minimizes or makes very unlikely the depositing of graphene oxide instead of graphene. It would be understood by one skilled in the art that the production of a negligible fraction of graphene oxide cannot be completely ruled out, but that even if this is the case, the primary deposit product would be graphene.

In one embodiment, the process of making GCGPs comprises: i) preparing a solution of sugar (dissolved in distilled water) combined with crushed glass particles at a ratio by weight of 75:100; ii) mixing continuously the sugar solution/crushed glass particle preparation gradually close to but less than 200° C., until the solution thickens, turns black in colour and starts smoking); iii) transferring the solution immediately to a preheated oven warmed up to 200° C. under the constant flow of nitrogen; iv) gradually heating the preparation by increasing the temperature of the oven to 450° C. within 30 minutes and maintaining the oven at 450° C. for one hour to produce the GCGPs; v) cooling down the GCGPs within the oven to room temperature; vi) processing the GCGPs to remove loosely attached carbonized material, activate and dry the GCGPs. Dried GCGPs prepared according to this process can be assembled into adsorption filters for use.

Application of the process or technique according to the present disclosure, practically immobilizes the graphene through bonding of carbon onto the surface of glass particle structures. To confirm the deposition of graphene (as opposed to graphene oxide) on the surface/circumference of crushed glass particles, X-ray diffraction analysis, Raman spectroscopy and other imaging or spectroscopy methods known in the art can be used (see FIGS. 16-25). For example, in X-ray (XRD) analysis, graphene gives a sharp diffraction peak observed at 2θ angle between 20-30 degrees, while graphene oxide will show a peak intensity at a much lower angle (2θ of around 10 degrees).

Working with one batch sample of GCGPs prepared according to the present disclosure (FIG. 22), SEM, Raman and XRD was used to analyze the coatings deposited onto crushed glass particles. Using SEM, several different types of structures were formed on top of glass particles, the majority of which were in form of layers of carbon (as confirmed through chemical analysis presented in FIGS. 16-21). Chemical analysis indicated that carbon content (by weight) of the GCGPs ranged from about 64.25% to about 74.97% while oxygen ranged from about 17.79% to about 21.81%. Si content of the GCGPs ranged between about 0.32% to about 5.65% in the sample tested. This indicates a reasonably high coverage (i.e. more than 94%) of glass particles by carbon.

Figure 22:
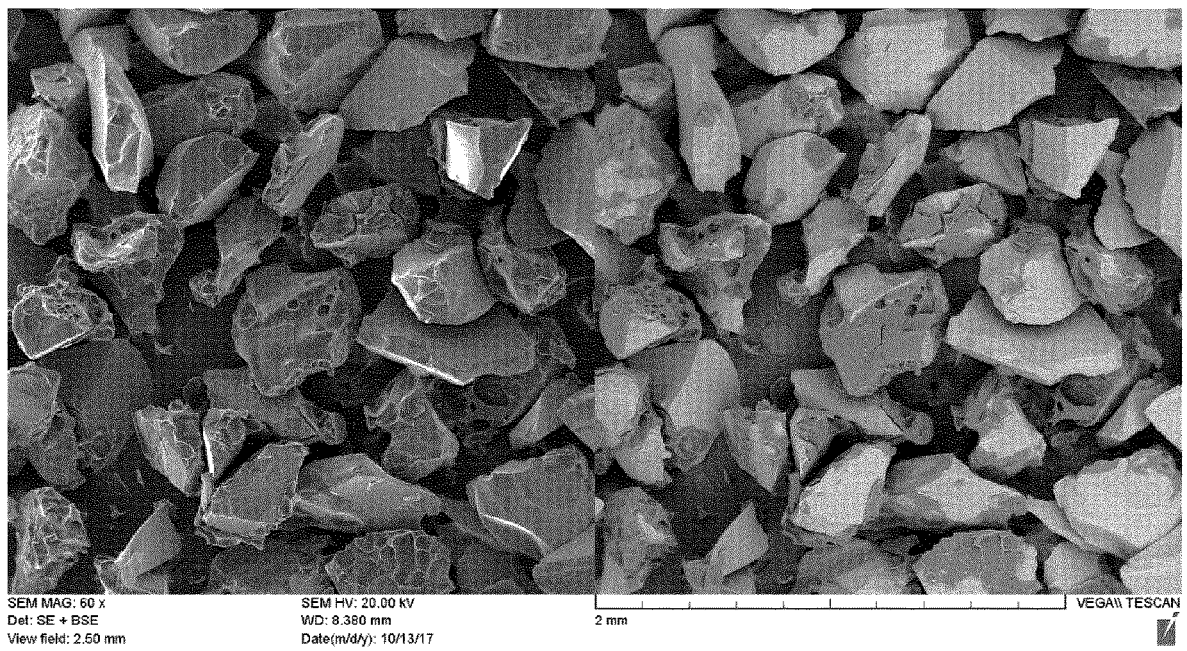
FIG. 22: SEM image of a portion of a batch sample of GCGPs made according to the present disclosure.
Figure 23:
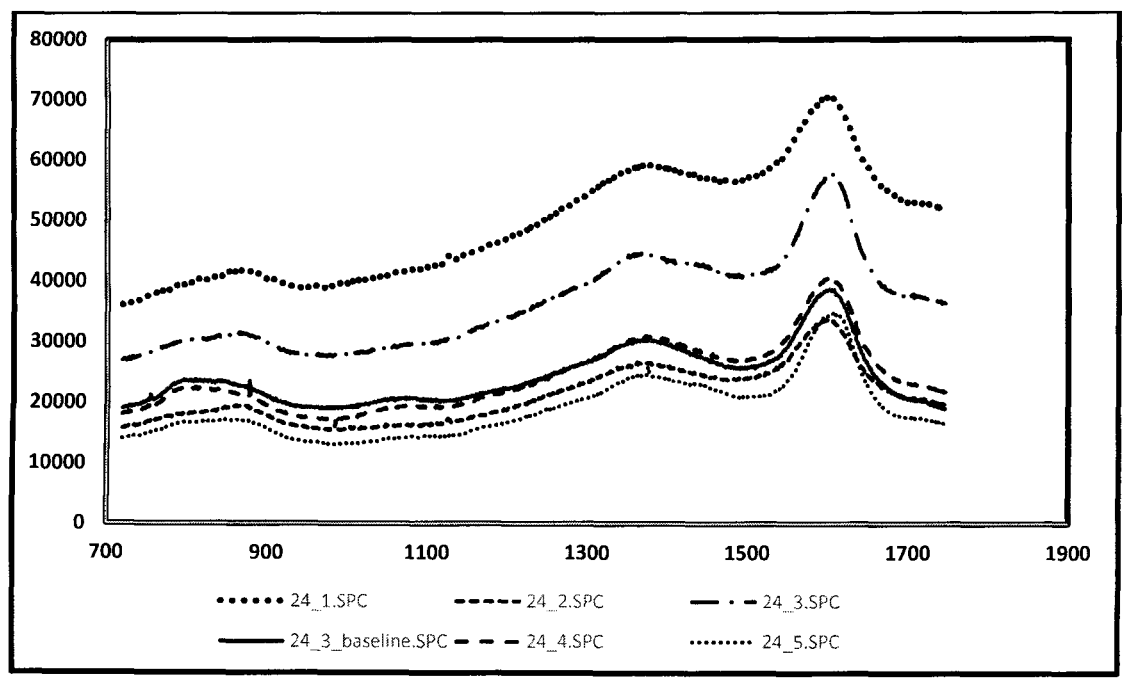
FIG. 23: Results of Raman spectroscopy on test samples of the GCGPs represented in FIG. 22.

Applying Raman spectroscopy to the same batch sample of GCGPs shown in FIG. 22, the position of the G peak (1600 cm-1) in FIG. 23 is indicative of "nanocrystalline" graphite or multilayered graphene for the different test samples of the GCGP batch sample prepared.

Figure 24:
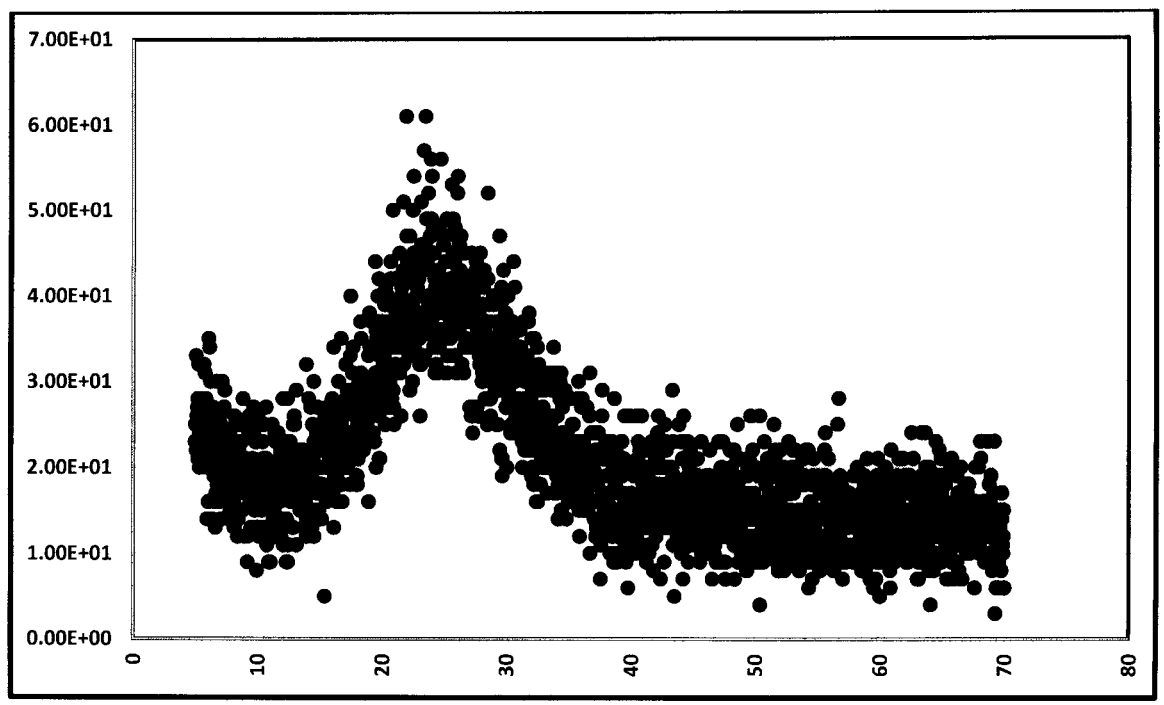
FIG. 24: XRD plot of a first test sample of GCGPs represented in FIG. 22.
Figure 25:
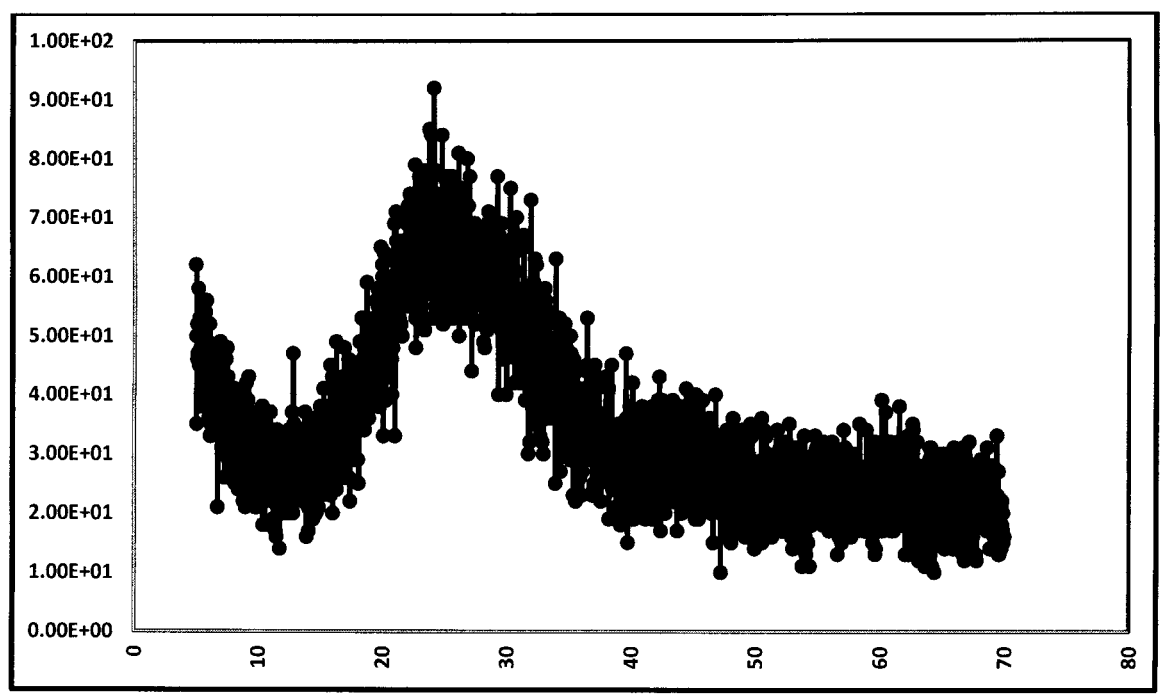
FIG. 25: XRD plot of a second test sample of GCGPs represented in FIG. 22.
Figure 27:
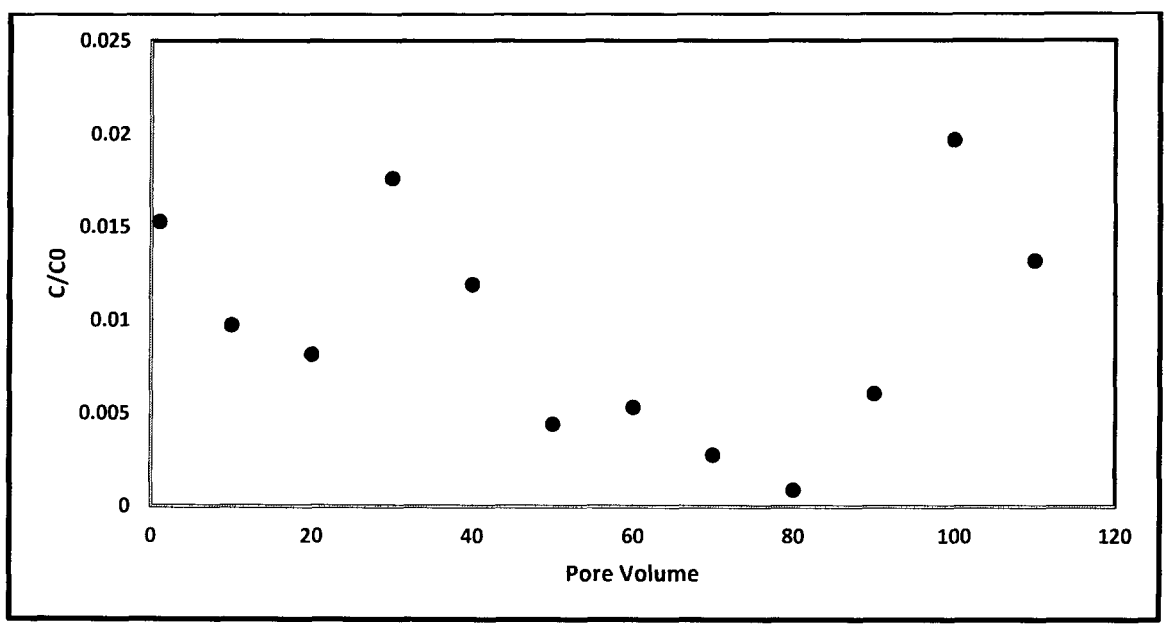
FIG. 27: Ratio of methylene blue effluent concentration to initial solution concentration plotted as a function of pore volume for a column of GCGPs.

Two exemplary XRD graphs are also provided at FIGS. 24 and 25 for the GCGPs of FIG. 22. The material portion used (test sample) was not crushed to a small size typically appropriate for XRD analysis and therefore the results presented are the best possible representation of the reflections. The reflection which is characterized as $2\theta$ of 23 to 25° indicates that the material is graphitic.

To confirm the strength of the bond between graphene and the surface of the crushed glass particles, GCGPs made by the process according to the present disclosure were placed in an ultrasonic bath for more than one hour, and no free graphene was detected in solution when measured by ultraviolet spectroscopy.

Key parameters influencing the coating profile (characteristics and properties), include, but are not limited to, the chemical composition of available (recycled) glass, grain (particle) size of the crushed glass and the temperatures applied to deposit (thermally bind) graphene coatings to glass. As exemplified in FIGS. 7-14, coatings can be characterized and their properties (such as stability) evaluated using various methods known in the art, such as, but not limited to, Scanning Electron Microscope (SEM), Raman spectroscopy, X-Ray Defraction (XRD). To further evaluate coating stability on crushed glass the performance of the coatings can be monitored under simulated environmental conditions, or directly in the field.

In one embodiment, the adsorbent capacity of GCGPs is evaluated using batch adsorption tests. In another embodiment, the adsorbent capacity of GCGPs is evaluated using column tests. In still a further embodiment, the adsorbent capacity of GCGPs is evaluated using mathematical modelling. In yet another embodiment, the adsorbent capacity of GCGPs is evaluated by conducting field tests.

Solutions containing target contaminants including, but not limited to, heavy metals (e.g., lead, cadmium, hexavalent chromium, arsenic, mercury etc.) and organic compounds (e.g., petroleum hydrocarbons, synthetic dyes (e.g. methylene blue), BTEX, TCE, PCE and some polycyclic aromatic hydrocarbons (PAHs)) can be prepared at different concentrations representing the range of concentrations found in real industrial/mining waste solutions and contaminated surface and ground waters. The various compounds and chemical properties of waste solutions and contaminated surface and groundwater, influencing factors such as pH and ionic strength can be considered when preparing synthetic solutions to customize GCGP configurations for optimal decontamination of contaminants from solution.

The performance of GCGPs for the removal of heavy metals from solutions can be evaluated through initial batch (adsorption) tests followed by column tests using different types of wastewaters and other solutions. Different GCGPs can be tested in batch adsorption tests to evaluate the best dosage and adsorption isotherm.

Based on the results of batch tests, column tests are can be implemented using various column packing lengths and contaminant loading rates to determine breakthrough characteristics and the overall performance of GCGPs in the removal of heavy metals and organic compounds from aqueous solutions, including the number of filtration cycles needed for efficient contaminant removal. Mathematical models can also be applied based on the findings of column tests to help predict and automate the determination of in field GCGP (filter) performance in removing heavy metals and other inorganic and organic compound from waste solutions.

According to column experiments conducted, an exemplary column may be 200 mm high with a diameter of 25 mm packed with GCGPs and be exposed to contaminated solutions at various loading rates. Column infiltration rates can be determined based on the results of batch tests including partitioning coefficients (kd) of contaminants and the associated adsorption isotherms. Columns can be run using fixed chemical composition and properties (including pH and ionic strength) since these will have already been explored in batch tests. A main factor in column tests will be loading/infiltration rate.

An exemplary protocol for testing a the adsorption capacity of GCGPS for a single contaminant includes the steps of passing a contaminated solution with a 1 ppm concentration of the single contaminant (e.g. lead) through a column packed with GCGPs at a constant flow rate (e.g. 3 ml/min). Every pore volume (pre-estimated volume, so 1 pore volume equals the volume of water that passes through all existing pores (void spaces) in the material packed within the column) is collected as the contaminated solution is fed continuously through the column. In the case of actual column tests conducted (see examples herein), after over 100 pore volumes, the contaminants tested for are not detectable (ND) in the column effluent.

In one embodiment, the graphene coating of GCGPs is functionalized to vary the adsorption and chemical sorption capacity for the removal/detoxification of contaminants from aqueous solutions. Examples of covalent and non-covalent functionalization options and protocols for graphene are referenced in Wang et al. and are readily available to one skilled in the art. In a related embodiment, the graphene coating of GCGPs is covalently functionalized. In another related embodiment, the graphene coating of GCGPs is non-covalently functionalized.

Applications of GCGPs

GCGPs are capable of detoxifying solutions contaminated with heavy metals and other organic and inorganic contaminants, such as pesticides, while providing several advantages over conventional waste solution treatment processes. The high specific surface area of the graphene coating on crushed glass particles and the possibility of functionalizing the coating aimed at adsorption and chemical sorption of different types of contaminants, along with the possibility of recycling the adsorbent provides a viable solution for the removal of various contaminants from a variety of solutions.

In one embodiment, GCGPs detoxify a contaminated solution from heavy metals. In a related embodiment, GCGPs reduce the amount of Pb, Cd and Cr from a contaminated solution. In still another embodiment, GCGPs reduce an initial concentration of 10 ppm Pb to less than about 4 ppb in an aqueous solution. In yet another embodiment, GCGPs reduce an initial concentration of 10 ppm Cd to less than about 8 ppb in an aqueous solution. In a further embodiment, GCGPs reduce an initial concentration of 10 ppm Cr to less than about 0.5 ppm in an aqueous solution.

In another embodiment, GCGPs convert over 97% of Cr (VI) to Cr (III) in an aqueous solution.

In another embodiment, GCGPs are used to decontaminate an aqueous solution from organic compounds. In a related embodiment, GCGPs reduce the amount PAHs from an aqueous solution. In still another embodiment, GCGPs reduce the amount of naphthalene, phenathren and acenaphthen in an aqueous solution. In yet another embodiment GCGPs reduce the point of substantially complete decontamination an initial concentration of 3 mg/L of naphthalene, phenathren and acenaphthen (I mg/L each) combined in an aqueous solution to undetectable levels.

In one embodiment, GCGPs are used to construct a filter unit (e.g. filters, filter packs, filtration beds, etc.) to detoxify contaminated solutions. In another embodiment, GCGPs are used to replace sand in a filter unit to detoxify contaminated solutions.

In another embodiment a filter unit comprising GCGPs is used to detoxify contaminated solutions. In a related embodiment, a filter unit comprising GCGPs is used for a multiplicity of adsorption/desorption cycles to detoxify contaminated solutions. In still a further embodiment, a filter unit comprising GCGPs is used for more than 10 adsorption/desorption cycles to detoxify contaminated solutions. In another embodiment, a filter unit comprising GCGPs is used for multiples of 10 adsorption/desorption cycles to detoxify contaminated solutions.

Depending on the type of contaminant and concentration in real wastewater/groundwater, the loading rates, retention times and overall GCGPs capacity for solution decontamination determined based on column tests can be used for implementation at real scale. Upon determination of contaminant removal parameters and capacities in column tests, GCGPs can be used in real scale pilot tests to verify capacities in connection with the flow rates and contaminant concentrations of real wastewater or groundwater flow to be treated. The contaminant loading rates determined based on column tests serve as the basis for design selection and capacity estimations at real scale. The adsorption, general decontamination capacity and ease of application of GCGPs is such that while flow rates of industrial wastewaters could range around tens to hundreds of cubic meters per day, the alteration of the existing infrastructure would be minimal in most cases for the purposes of field testing and full scale application.

The GCGPs as illustrated in FIGS. 1-5 can be used for contaminant treatment of any type of contaminated surface water and groundwater, domestic sewage, industrial wastewater, landfill leachate, healthcare waste, industrial and hazardous waste, and acid mine drainage (AMD) with various concentrations of metals and metallic compounds and other constituents such as sulfates, etc. Test results have indicated that a filtration bed or filter system containing GCGPs is able to reduce the initial 10 ppm concentration of Pb, Cd and Cr consistently to less than 4 ppb, 8 ppb and 0.50 ppm respectively. The results were obtained using a column packed with about 200 grams of GCGPs at a loading rate of up to 5 m$^3$/day of contaminated solution.

With reference to FIGS. 1-3, GCGPS are capable of adsorbing heavy metals (in dissolved ion form and metallic compounds), organic compounds (including but not limited to petroleum hydrocarbons, polycyclic aromatic hydrocarbons (PAHs), pesticides, herbicides, persistent organic pollutants (POPs) etc.), and other inorganic constituents such as compounds of nitrogen, phosphorus, sulfur and other anions and cations and salinity.

The GCGPs made according to present disclosure may be used to make highly efficient adsorptive filter system, reduces environmental burden associated with sludge and glass disposal, and lead to significantly lower wastewater treatment costs. The strong adsorptive bond between contaminants and the graphene coated onto crushed glass provides for environmentally efficient disposal options for end of life GCGPs (e.g. GCGPs loaded with contaminants removed from aqueous solutions). Instead of going to a landfill or being recycled by treating GCGPs for the desorption of contaminants, end of life GCGPs may be used as part of the base material in road and pavement construction, concrete aggregates and for similar applications in compliance with regulatory requirements (e.g. satisfying leaching test thresholds and the like). This reduces the demand for natural materials while reducing the volume of waste.

In one embodiment, GCGPs are used in ex-situ (onsite) contaminated water treatment systems. In another embodiment, GCGPs are used to replace the sand in filter units of on-site treatment systems. Where ex-situ (on-site) treatments of industrial wastewaters are to be conducted, a reactor packed with GCGPs can be used and part of the wastewater flow can be directed to the reactor with minimal additional piping.

Figure 4:
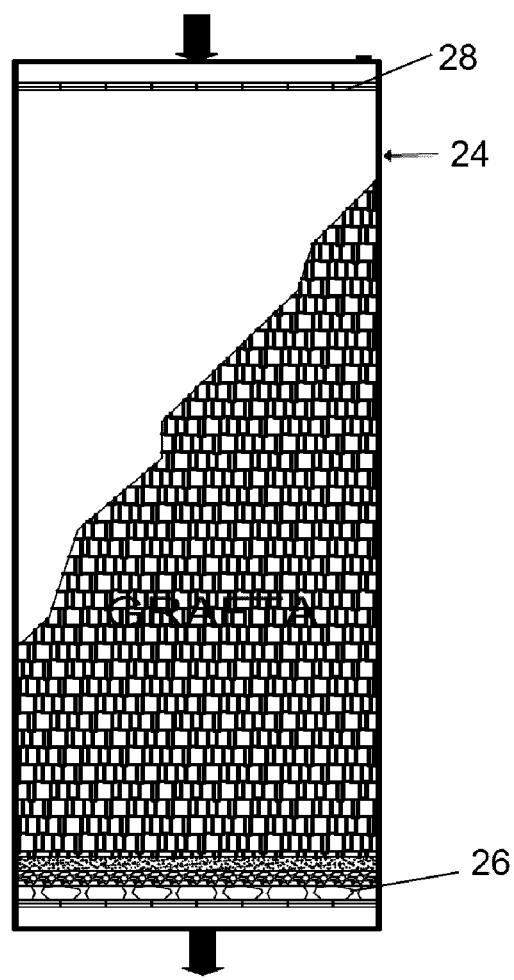
FIG. 4: is a simplified (schematic) complete profile of the graphene coated crushed glass particles installed within a filter package (system), according to the present disclosure.

For onsite treatment, contaminated water flows are directed into beds of GCGPs which will be installed inline as an up-flow or down-flow filter package. A generalized layout of an inline application of GCGPs is schematically shown in FIG. 4. The ex-situ (on-site) installation may operate as a gravity (or optionally as a pressurized filter package) in the form of prefabricated filter units of cylindrical tanks 24 which may be made of concrete, steel, iron, aluminum and other alloys in combination with plastic, polyethylene, polyester, polyvinyl chloride and other polymeric materials as appropriate, equipped with a drainage system 26 and influent distribution system 28, along with flow control and measurement and monitoring instrumentation (not shown).

In this configuration, the flow of wastewater and/or contaminated water may be directed into the GCGP filtering system at a predetermined loading rate depending on contaminant(s) concentration. The actual adsorptive filter material can be removed from the casing to facilitate its removal for the purposes of regeneration of the material and/or other forms of recycling. GCGPs filtration bed material may be provided in a number of sizes and capacities for various applications and can be customized for more complex waste solutions. GCGP filter casings can be supplied in modular formats so that the capacity can be increased incrementally according to capacity requirements and with minimal installation and construction efforts being applied. Alternatively, GCGPs filtration materials and beds can be used as retrofit options for existing sand filters with practically no alteration to their configuration in order to gain the advantage of enhanced contaminant removal by GCGPs according to the present disclosure.

In a further embodiment, GCGPs are used for in-situ (in ground) treatment of contaminated water.

Figure 5:
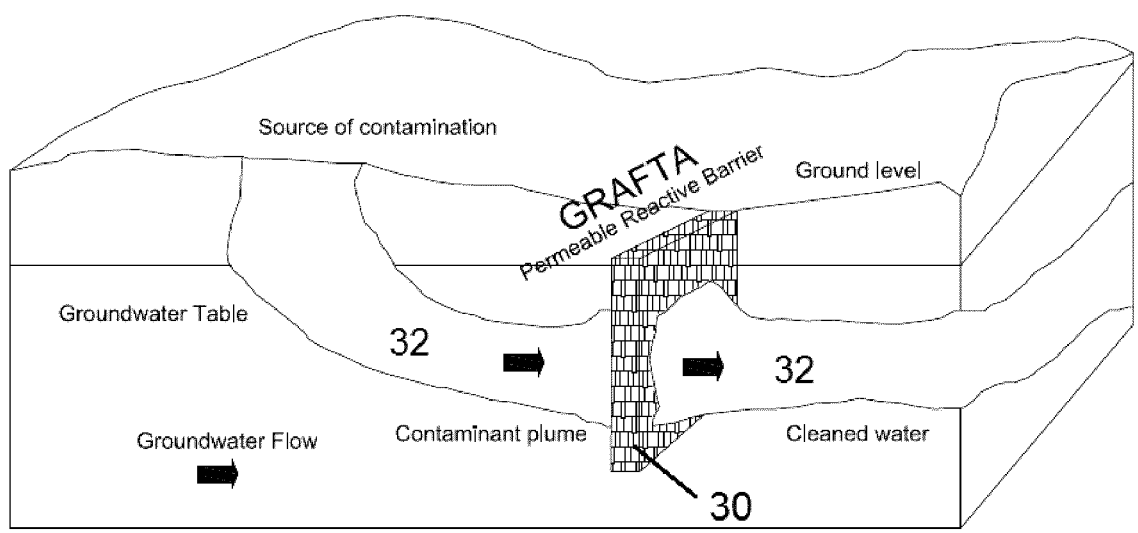
FIG. 5: is a schematic view of the graphene coated crushed glass particles configured in a system for in-situ wastewater treatment in the field, according to the present disclosure.
Figure 6:
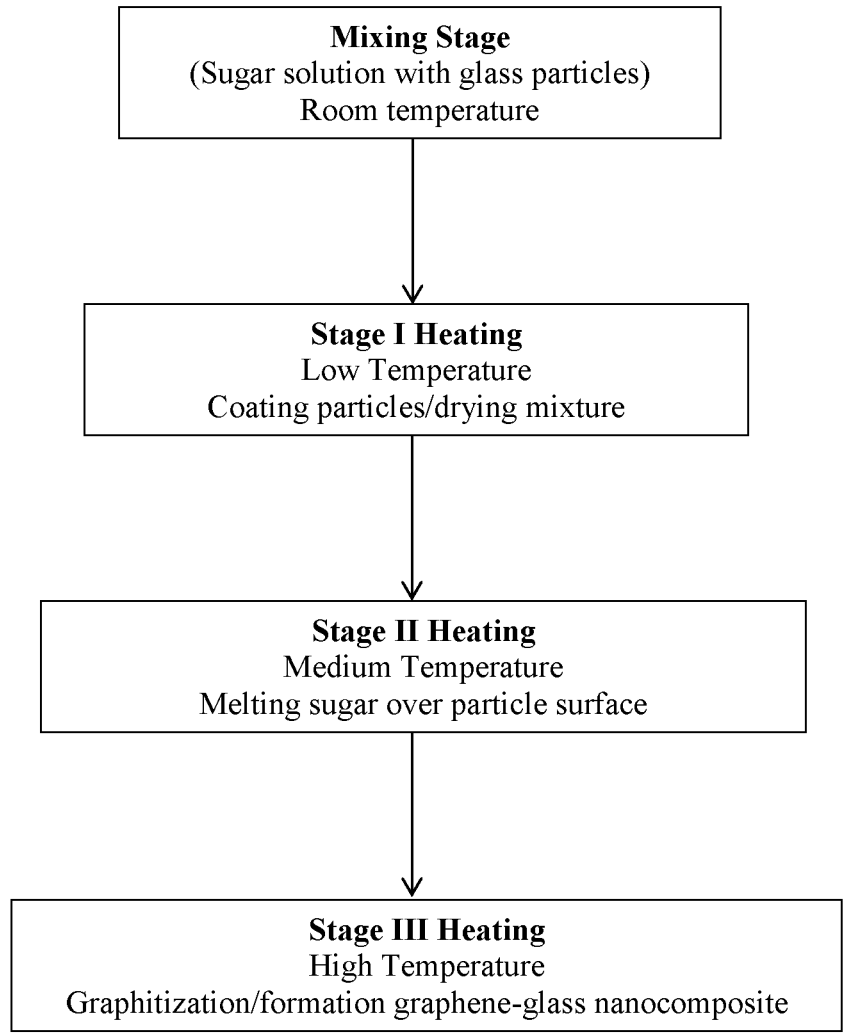
FIG. 6: is a process flow schematic for making graphene coated (crushed) glass particles (GCGP(s)) according to the present disclosure.

With reference to FIG. 5, GCGPs are configured in filter units installed as a permeable wall inside or downstream of contaminated solutions percolating through porous media. Where a permeable reactive barrier is to be used for the treatment of contaminated groundwater (in-situ application), a shallow trench can be excavated perpendicular to the direction of the groundwater flow and GCGPs can be placed or contained within a separator geotextile. As shown in FIG. 5 the GCGP assembly (filter unit) can be used as an attenuation and treatment layer 30 within permeable reactive barriers (PRBs) 32. Uses of this configuration could be in natural/constructed attenuation layers beneath barrier systems in landfills, as permeable reactive walls downstream or upstream of tailing dams, as permeable reactive dams or walls for in-situ treatment of acid mine drainage (AMD) and for other similar applications.

For example, in the case of the application of GCGPs in relation to tailing dams and acid mine drainage (AMD), GCGP materials configured as filter units can be placed on the upstream or downstream face of any tailing dam to act as a decontamination filter removing contaminants while exposed to seepage of contaminated liquid through a dam.

GCGP filtering systems installed as a constructed natural attenuation layer underneath landfills receiving either municipal solid waste or hazardous waste would act as an additional filtration layer capable of removing contaminants which escape from the lining systems typically employed in landfill sites. Thus, groundwater contamination can largely be minimized or even avoided using GCGP material beneath conventional landfill barrier systems.

There are two basic strategies that can be applied for end of life GCGPs, regeneration and use as base materials in construction applications.

In one embodiment, heavy metal contaminants adsorbed to GCGPs are removed using strong acid solutions. In another embodiment, organic contaminants adsorbed to GCGPs are removed using organic solvents. This allows for the regeneration of GCGP material to be used for further adsorption of heavy metals and organic contaminants.

Regenerating filter material mainly involves desorption of contaminants already adsorbed by the filter. Depending on the type of contaminants, appropriate desorption solution can be identified and desorption rates determined. For example, heavy metal desorption in general can be achieved through washing the material with acids such as nitric acid and hydrochloric acid. The dosage and rates and other environmental conditions such as temperature or additional chemicals are available to one skilled in the art. For organic contaminants different types of organic solvents such as acetone and dichlorometane can be used.

In another embodiment, GCGPs saturated with contaminants removed from solutions is used as a component in materials used to construct roads and concrete structures. Application of saturated GCGPs in this manner would be based upon compliance with regulatory leaching restrictions. TCLP (the standard toxicity characteristic leaching procedure, mandated by the US Environmental Protection Agency (EPA), i.e. US EPA SW-846 Test Method 1311: Toxicity Characteristic Leaching procedure) would be performed using about 100 g of used (e.g. with adhered contaminants, reduced adsorbance capacity or end-of-life) GCGPs. The used GCGPs can be permeated slightly with acidified water (e.g. citric acid) and then the resulting effluents tested for the presence of contaminants.

Due to the significant adsorption capacity of GCGPs and consequently long service cycle when configured as a filter, and the lower cost of GCGPs compared to other filtering means used within the same industrial category, GCGP filter units can, alternatively, be removed and recycled in the form of construction materials. TCLP can be applied on end-of-life GCGPs, based on the recycling strategy that is elected. For example, the options may include either using end-of-life GCGPs as is in infrastructure (e.g., road base material), using it in a binding matrix such as concrete, or regenerating the GCGPs.

In a further embodiment, GCGP filter units are used in conjunction with particulate matter filter units in a filtering system. Whether GCGPs are in a filter format for ex-situ (on-site) use or a format for in in-situ treatment systems, the GCGP filter units are not configured for the removal of particulate matter. When used in permeable reactive barriers, the incoming flow would be groundwater which typically has very small and sometimes negligible concentration of particulate matter (although there might be a small concentration of colloidal material present not expected to substantially affect GCGP performance). In cases where waste water may have higher concentrations of relatively coarse particulate matter, other filter units and particulate matter removal processes known in the art can be used prior to running contaminated solutions through a GCGP filter unit.

While the foregoing written description of the invention enables one of ordinary skill to make and use what is considered presently to be the best mode thereof, to provide a better understanding of the invention described herein, the following examples are set forth. It will be understood that these examples are intended to describe illustrative embodiments of the invention and are not intended to limit the scope of the invention in any way.

EXAMPLES

The following examples provide exemplary protocols for making and testing GCGPs.

Example 1: Exemplary Protocol for Making GCGPs

Glass particles from solid waste streams are generally available as recycled glass of various colors and ranging in size from a fraction of a millimeter up to over 2 mm. Glass substrate material should be as free as possible from contaminants such as plastics, paper and paint including but not limited to printed or attached labels of any form. Prior to use, recycled glass is washed with water to remove water soluble attachments and if needed washed with organic solvents such as dichloromethane to remove printed labels. In some cases weak acid solutions such as chloric acid can be used. Mechanical sorting techniques and equipment which increase the proportion of clear glass relative to coloured glass can also be applied to prepare suitable substrate starting material.

The process according to the present disclosure is carried out in stages and may involve continuous stirring/mixing in all stages. The retention time at different temperatures needs to be monitored to prevent a decrease in optimal coating quality (e.g. uniformity of thickness, coating of the glass surface, the presence of nanosheet outcroppings, etc.) over extended periods.

Relevant parameters in the optimization of the coating process are (i) the ratio of sugar to crushed glass, (ii) particle size of crushed glass, (iii) temperature, and (iv) retention time. Atmospheric reaction conditions is another parameter that may be varied (e.g. under vacuum, inert or other gas conditions to control oxidation reactions).

In one exemplary generalized protocol the sugar to glass ratio may be varied between 30-300%. The sugar (e.g. sucrose) solution and crushed glass are first mixed at room temperature. With the mixture placed under nitrogen, the temperature is increased from room temperature incrementally to about 100° C. over the course of 30 min. The mixture is stirred at 100° C. for an additional 30-45 min. The temperature is then increased incrementally to about 200° C.

over the course of 30 min. under nitrogen. Stirring/mixing is maintained at 200° C. for an additional 1-2 hours to achieve good graphene coating uniformity. The temperature is then increased incrementally to a maximum temperature of about 450° C. over the course of 30 min. under nitrogen. Stirring/mixing is maintained at 450° C. for an additional 1-2 hours of reaction to achieve a high degree of graphitization, followed by a gradual cooling stage at room temperature. It is noted that retention times of 3 hours or more at maximum temperatures near or within a high temperature range reduces coating efficacy and the performance of GCGPs.

In a variation of the above protocol, a fine particle size of crushed glass (e.g. up to about 0.5 mm grain size) is used with an initial ratio of 75 (sugar):100 (crushed glass) (e.g. 75 g of sugar with 100 g of crushed glass) applying a maximum temperature of 450° C. with a retention time of 1 hour.

For example, to produce the GCGPs represented in FIG. 22 a solution of sugar (dissolved in distilled water) together with crushed glass particles at a ratio by weight of 75:100 was prepared, mixed continuously and heated gradually on a hotplate close to a temperature of, but less than 200° C., until the preparation thickened, turned black in colour and started to smoke. The preparation was transferred immediately to a preheated oven warmed up to 200° C. under constant flow of nitrogen, after which the temperature was gradually increased to 450° C. within 30 minutes and maintained at 450° C. for one hour to produce the GCGPs. The GCGPs were cooled down within the oven to room temperature, washed with (distilled) water, subjected to ultrasound for about 30 minutes to remove loosely attached carbonized material and washed with water to remove detached particles. The washed GCGPs were then immersed in concentrated sulphuric acid for about 30 minutes to further remove loose graphitic particles and activate the GCGPs, followed by washing with water until a neutral pH was achieved. The GCGPs were then allowed to air dry prior to use for chemical analysis, batch adsorption and column testing.

The resulting GCGPs from the above described process are activated with concentrated sulphuric acid and exhibit good performance, as exemplified in Example 2.

Sample chemical composition in terms of the percentage of carbon, oxygen and silicon in the GCGPs produced using the described process are shown in Table 1 of FIG. 15.

Process variations to change and control the degree and nature of graphene layer deposition to the surface of crushed glass particles can be applied using statistical methodologies to select optimal process conditions, including the use of various software tools such as, Design-Expert® (www.statease.com; Stat Ease, Inc.). Process variation inputs would include glass particle size, sugar/glass ratio, temperature (including $T_{max}$) and reaction time. Process outputs will be graphene coating size and form (e.g. width, length, number of layers, outcrop formations), and the distribution/density of graphene on crushed glass particles.

The generalized process of Example 1 was used to make various batches of GCGPs using varying sugar to glass ratios and glass particle sizes. The results of SEM imaging to show the 3D graphene structure of the GCGPs produced are shown in FIGS. 7-14. Formations of low thickness graphene emanating from the surface of glass particles (or a graphene coating base on said glass particles) are indicative of GCGPs with adsorbance capacity as contemplated by the present disclosure. Such outcroppings significantly increase the overall surface area of graphene (where actual adsorbance occurs) beyond what a relatively flat surface of graphene on the glass particle surface could offer. Instead, base surfaces of graphene-glass nanocomposites function as a platform for the growth of graphene nano-sheets vertically and spreading laterally at different angles relative to base surface. Moreover, even if there are carbon clots which form on the GCGPs, the prevalence of 3D outcroppings will be determinative of adsorptive capacity.

Figure 7:
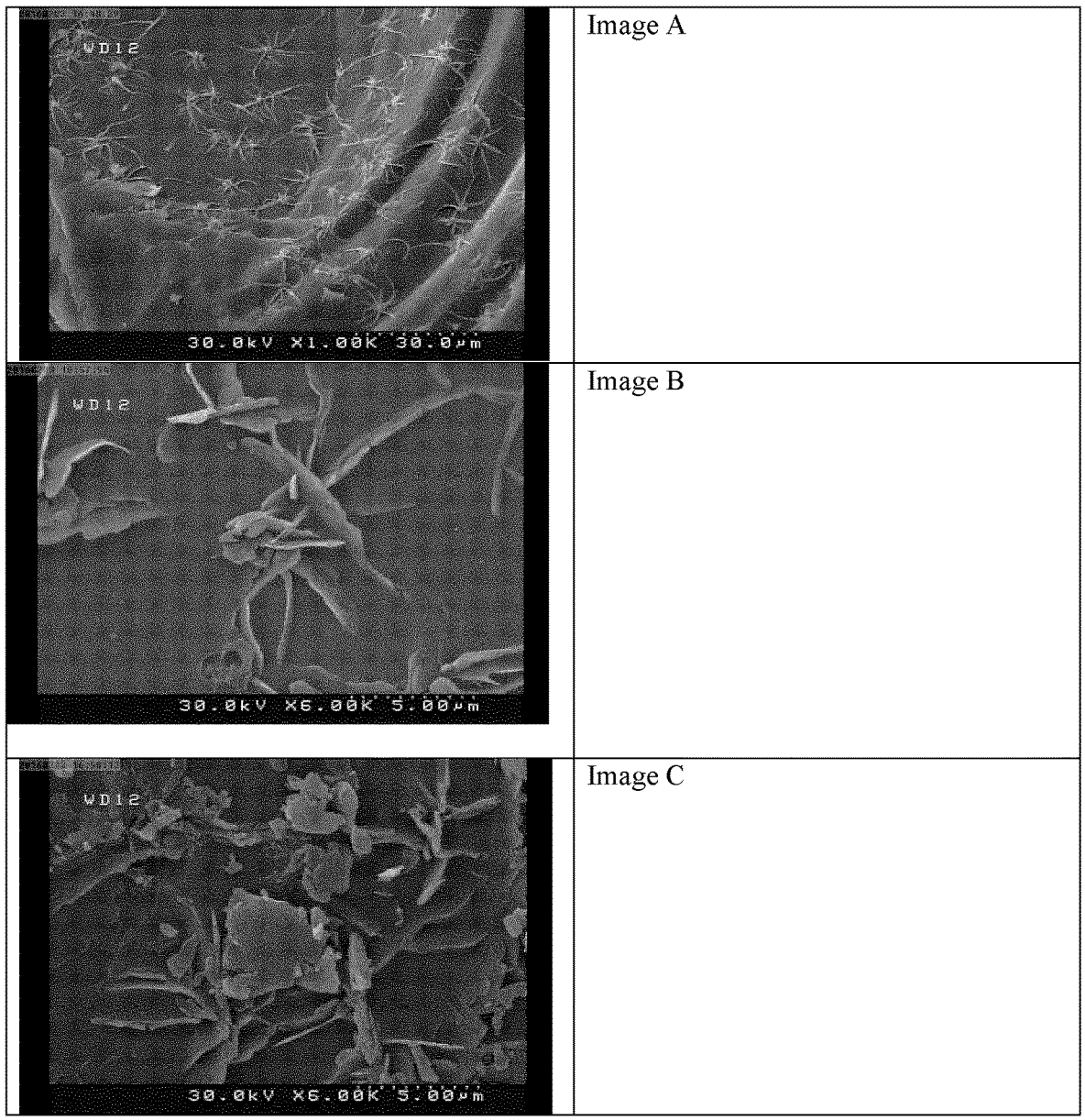
FIG. 7: SEM images of web-like outcrops on a carbon base of GCGP(s) produced using a sugar to glass ratio of 75% and glass particle size of about 0.2 mm.

In FIG. 7, the 3D structure was produced using a sugar to glass ratio of 75% and glass particle size of about 0.2 mm. Image A depicts the formation of spider-web shaped 3D structures over the base coating of carbon. The wings of the structures extend in micrometers with thicknesses nano-scale thicknesses. Image B depicts a close-up of the 3D structure formed over carbon coating indicating thickness of the formation to be less than 200 nm. Image C depicts alternative types of 3D formations on top of the carbon base (thicknesses less than 200 nm were observed).

Figure 8:
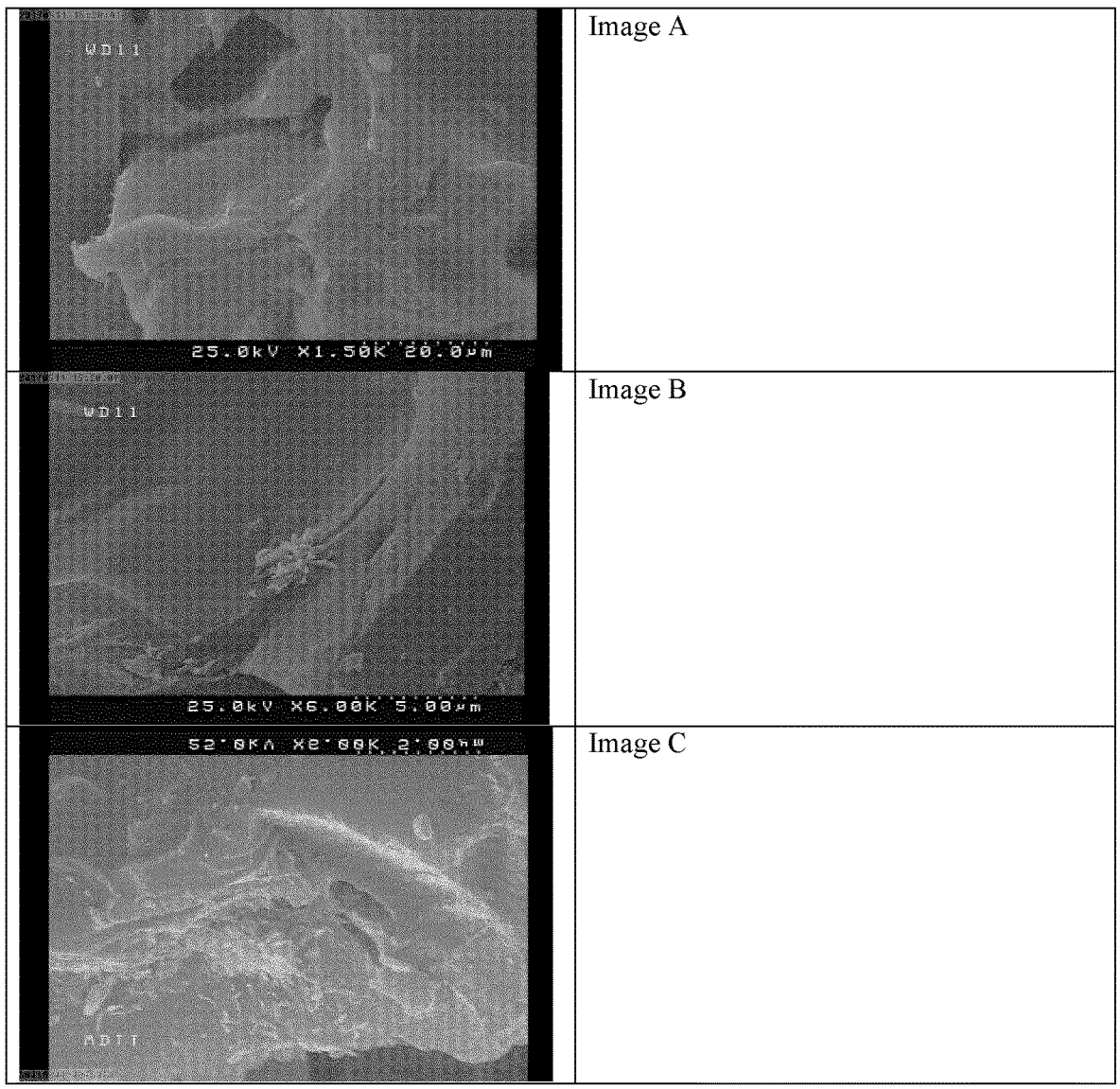
FIG. 8: SEM images of mixed formation or irregular outcrops on a carbon base of GCGP(s) produced using a sugar to glass ratio of 75% and glass particle size of about 0.105 to 0.25 mm.

In FIG. 8, the 3D structure was produced using a sugar to glass ratio of 75% and glass particle size of about 0.105 to 0.25 mm. Image A depicts irregular 3D structures of carbon formation over the carbon base. Image B depicts crystallization of multilayered carbon over base carbon at a nanoscale. Image C depicts distribution of centralized crystallization on top of the base carbon layer.

Figure 9:
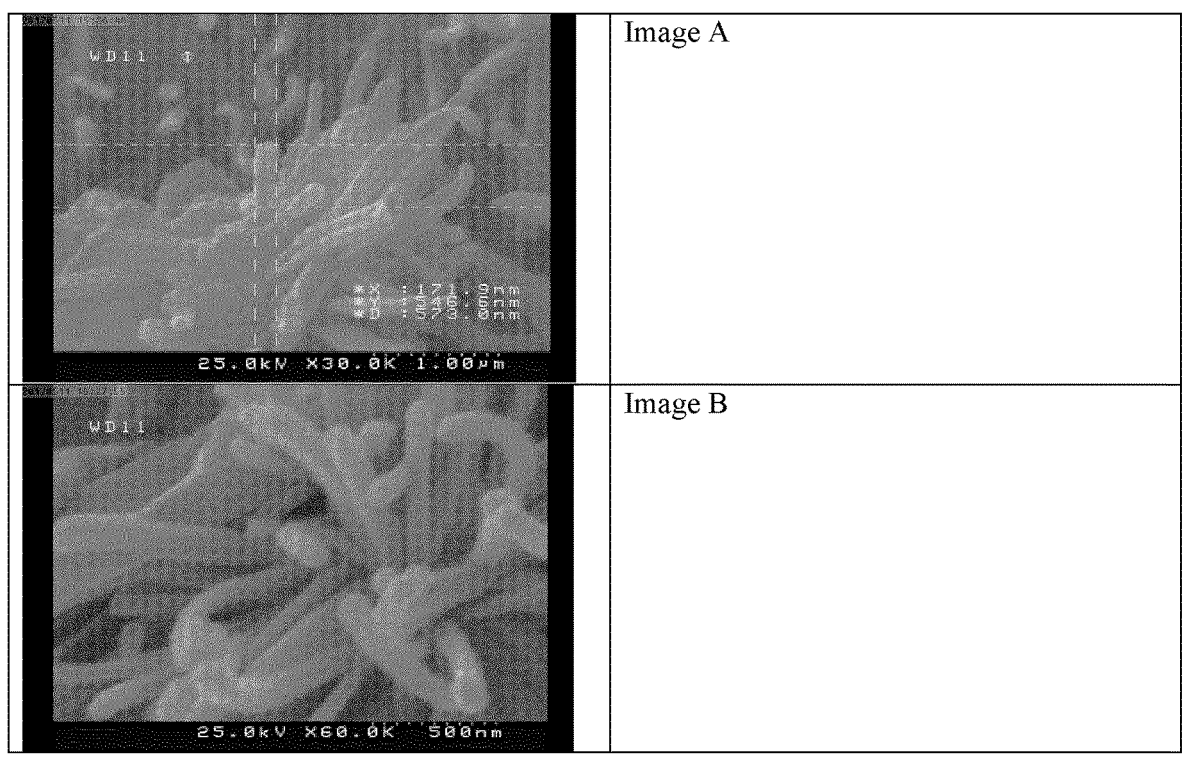
FIG. 9: SEM images of tubular outcrops on a carbon base of GCGP(s) produced using a sugar to glass ratio of 75% and glass particle size of about 0.105 to 0.25 mm.

In FIG. 9, the 3D structure was produced using a sugar to glass ratio of 75% and glass particle size of about 0.105 to 0.25 mm. Image A depicts 3D tube-like formations at a nano-scale (diameter of about 170 nm). Image B depicts 3D tube-like carbon structures at a nano-scale formed over the base carbon.

Figure 10:
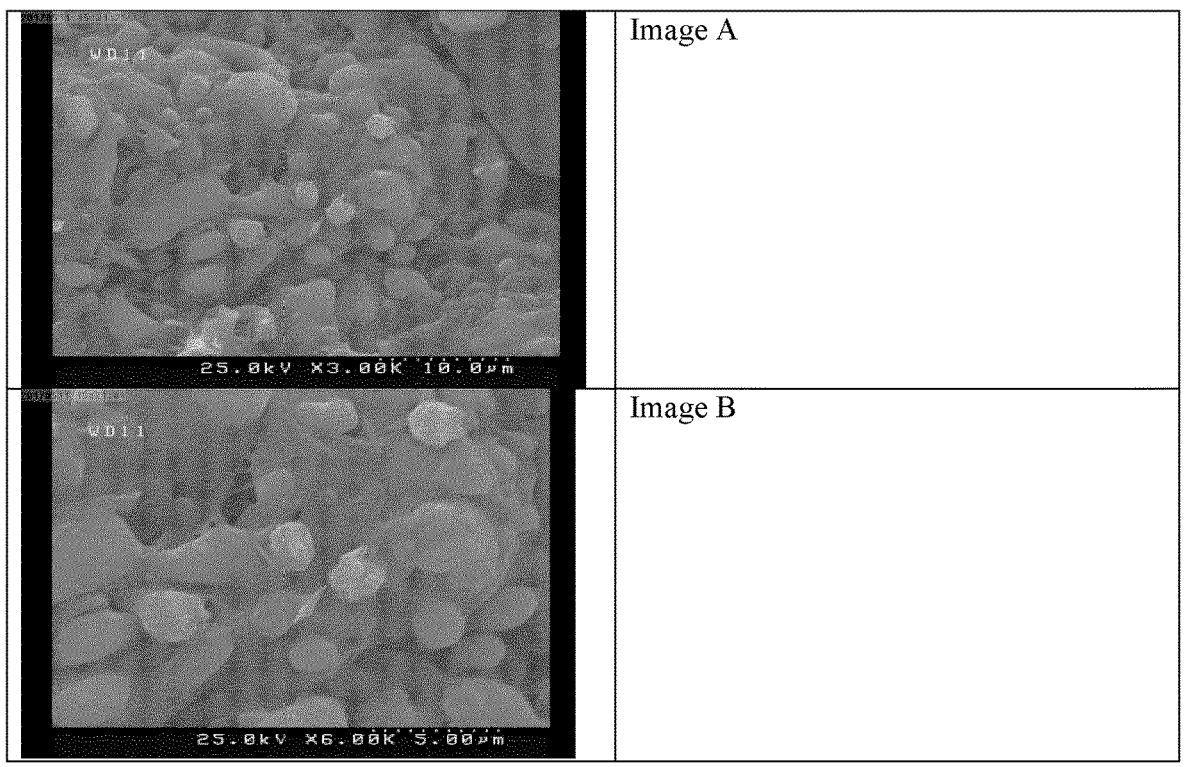
FIG. 10: SEM images of pellet outcrops on a carbon base of GCGP(s) produced using a sugar to glass ratio of 45% and glass particle size of about 0.105 to 0.25 mm.

In FIG. 10, the 3D structure was produced using a sugar to glass ratio of 45% and glass particle size of about 0.105 to 0.25 mm. Image A depicts the distribution of another crystallization form, carbon pellets over the base carbon coating. Image B depicts the distribution of carbon pellets over the base carbon coating (as seen in Image A) at a deeper zooming scale.

Figure 11:
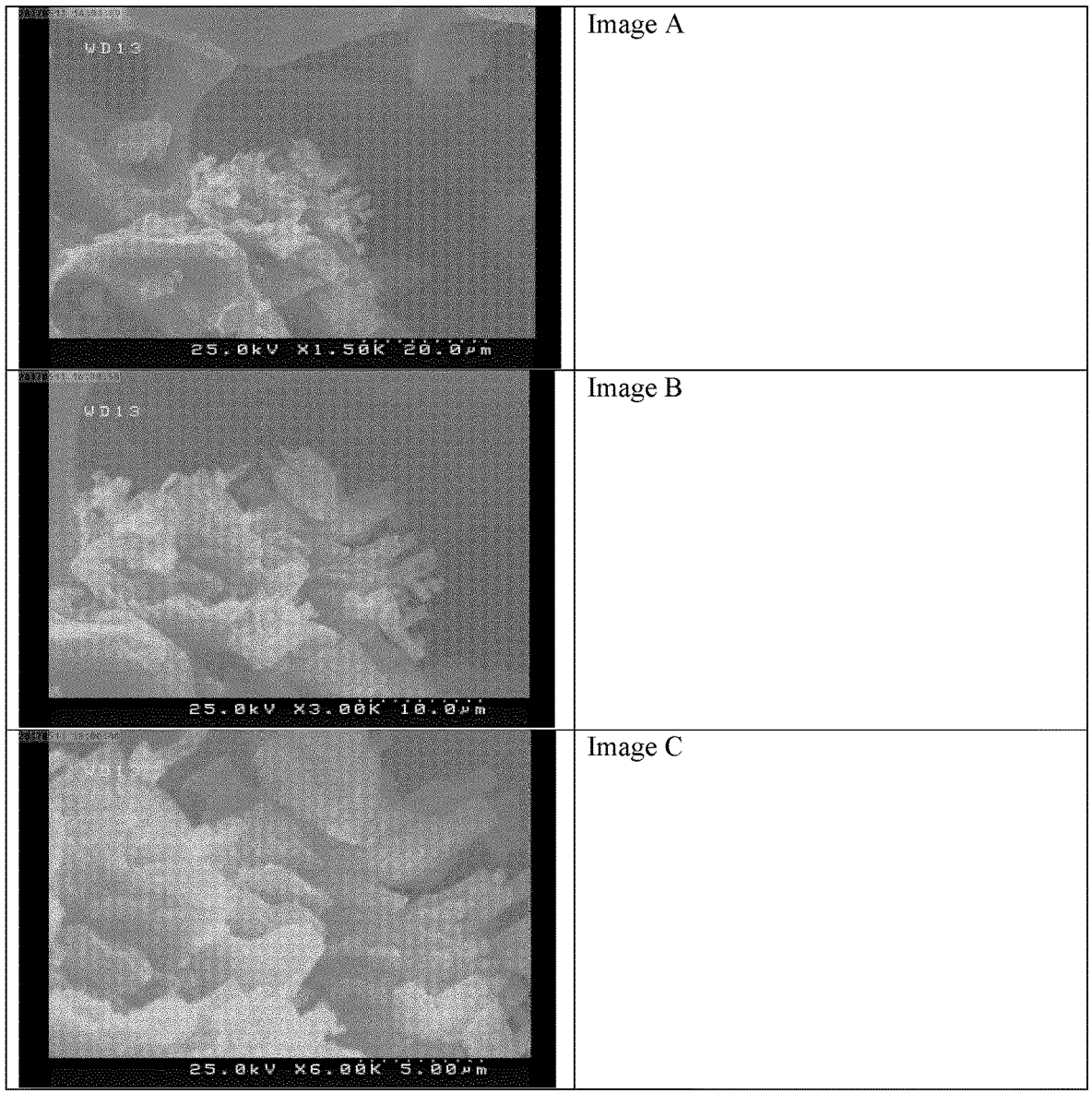
FIG. 11: SEM images of flake outcrops on a carbon base of GCGP(s) produced using a sugar to glass ratio of 60% and glass particle size of about 0.105 mm.

In FIG. 11, produced using a sugar to glass ratio of 60% and glass particle size of about 0.105 mm. Image A depicts another example of crystallization of carbon layers over the base carbon coating. Image B depicts a deeper zooming of Image A. Image C depicts a still deeper zooming of Image A and B showing nano-scale layers formed over the base carbon coating.

Figure 12:
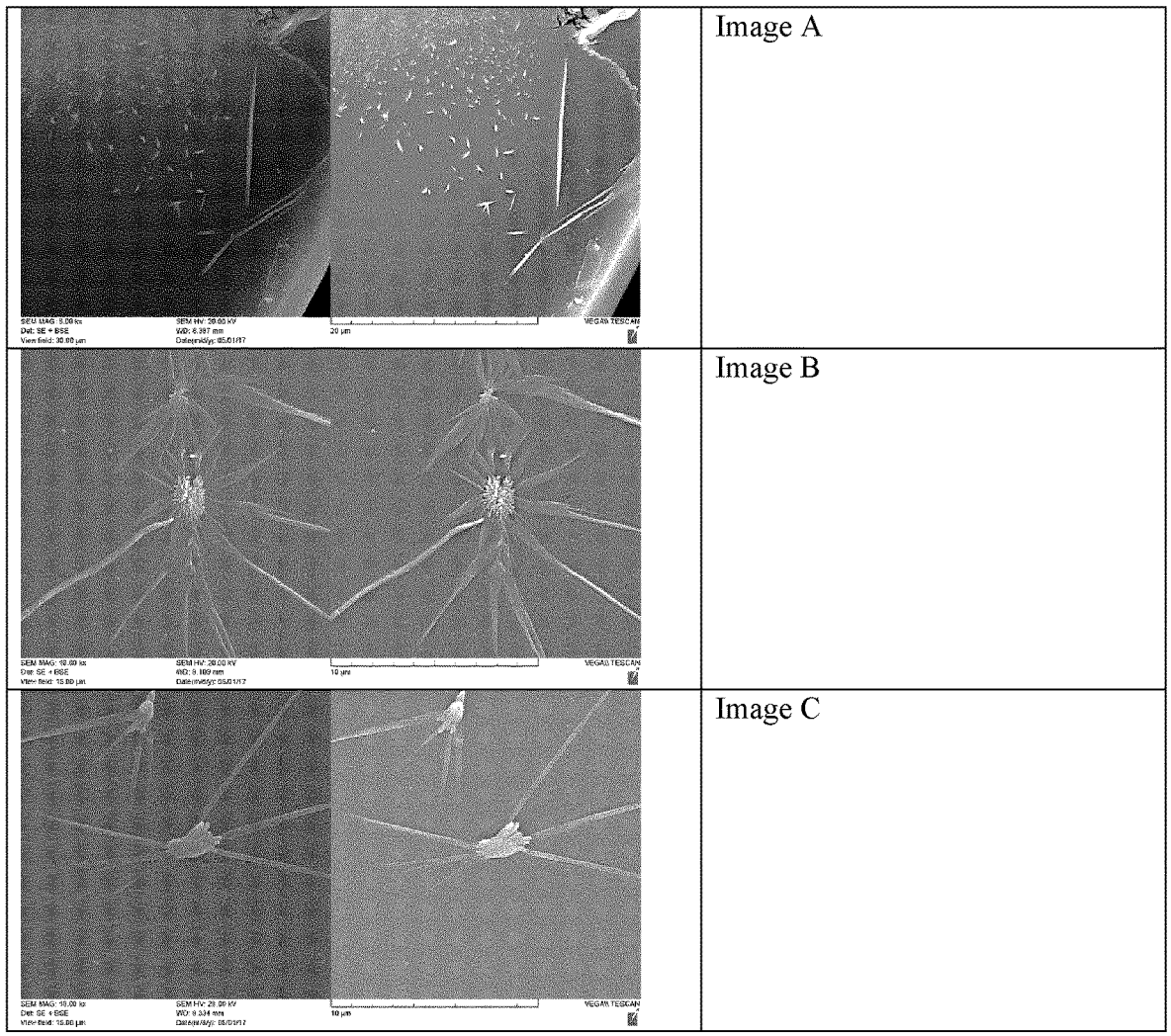
FIG. 12: SEM images of web-like outcrops on a carbon base of GCGP(s) produced using a sugar to glass ratio of 200% and glass particle size of about 0.25 mm.

In FIG. 12, produced using a sugar to glass ratio of 200% and glass particle size of about 0.25 mm (slightly crushed glass beads). Image A depicts the distribution of spider-web like layers of thin layers of carbon over the base carbon coating at a nano-scale. Image B depicts a deeper zoom of the spider-web like 3D carbon structure of Image A over the base carbon coating. Image C depicts another example of 3D crystallization of thin carbon layers over the bae carbon coating.

Figure 13:
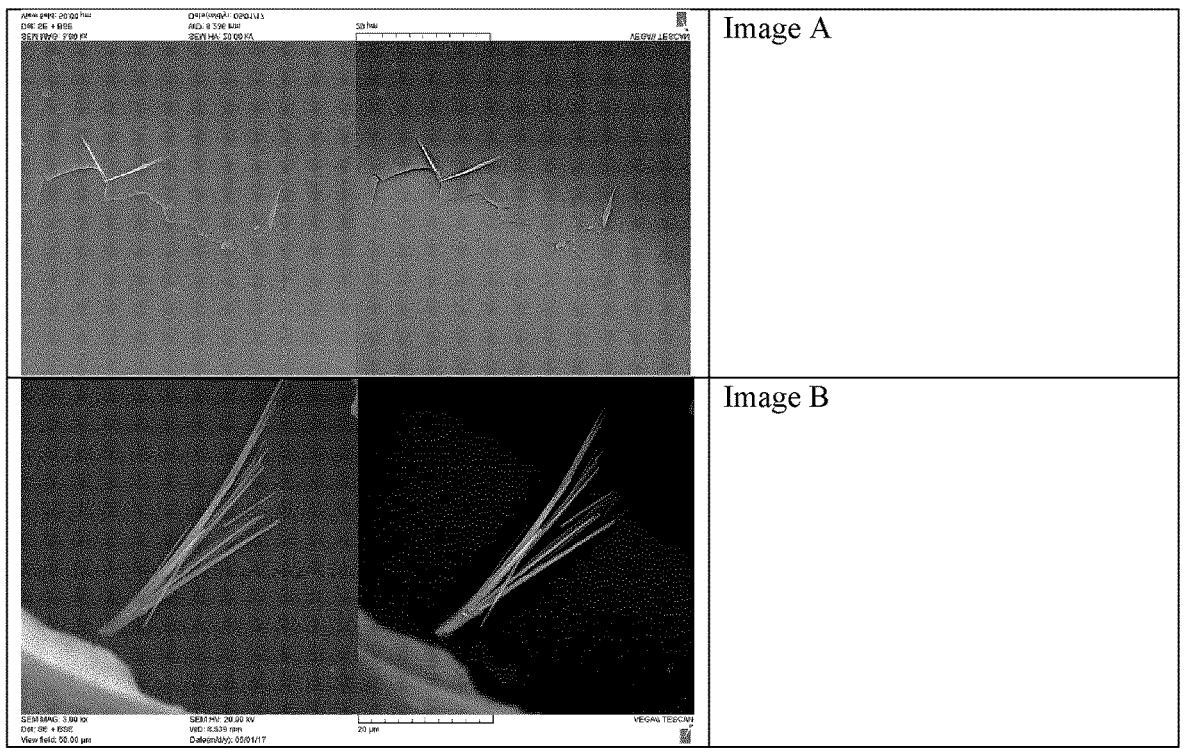
FIG. 13: SEM images of spike outcrops on a carbon base of GCGP(s) produced using a sugar to glass ratio of 200% and glass particle size of about 0.25 mm.

In FIG. 13, produced using a sugar to glass ratio of 200% and glass particle size of about 0.25 mm (slightly crushed glass beads). Image A depicts another form of crystallization over the carbon coating. Image B depicts a deeper zooming of Image A showing the nano-scale 3D structure of carbon layers grown over the base carbon coating.

Figure 14:
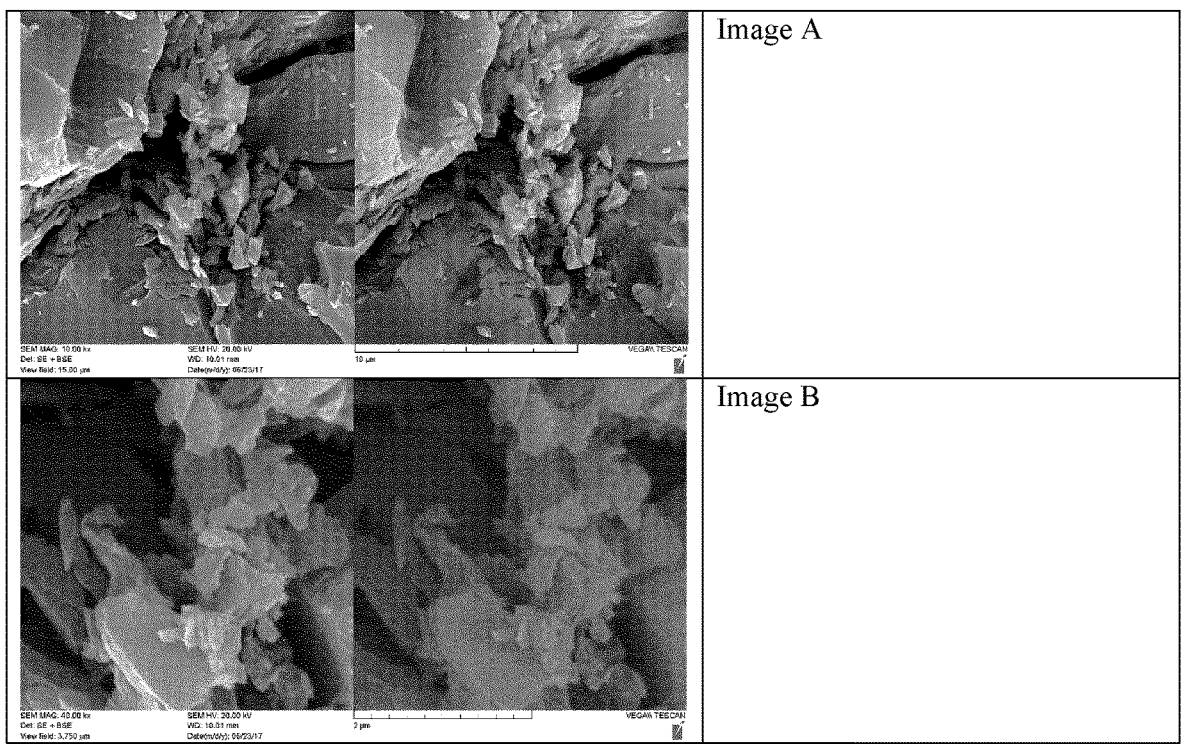
FIG. 14: SEM images of mixed formation or irregular outcrops on a carbon base of GCGP(s) produced using a sugar to glass ratio of 150% and glass particle size of about 0.425 mm.
Figure 16:
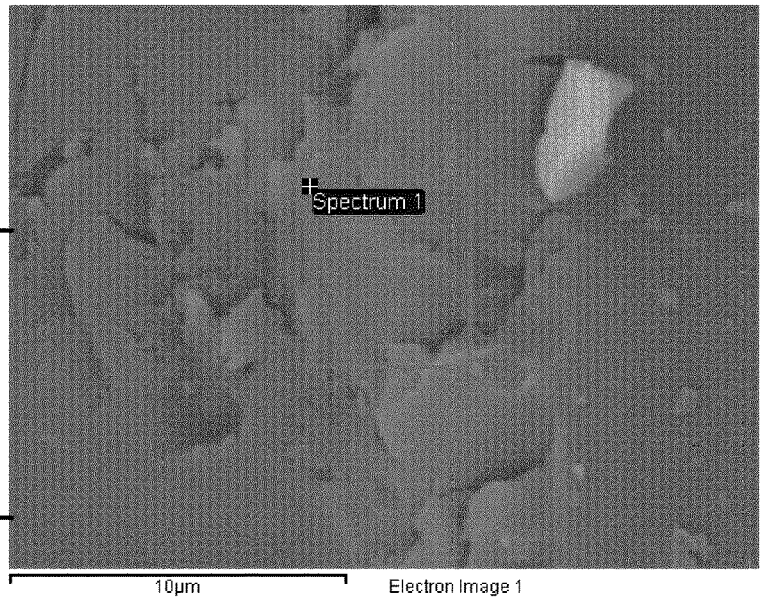
FIG. 16: Chemical analysis (Table 2 and Spectrum 1) of region of GCGPs represented in FIG. 22 and more particularly from spectrum area of SEM image (sample 24 #40-60 75% eds 1).
Figure 16:
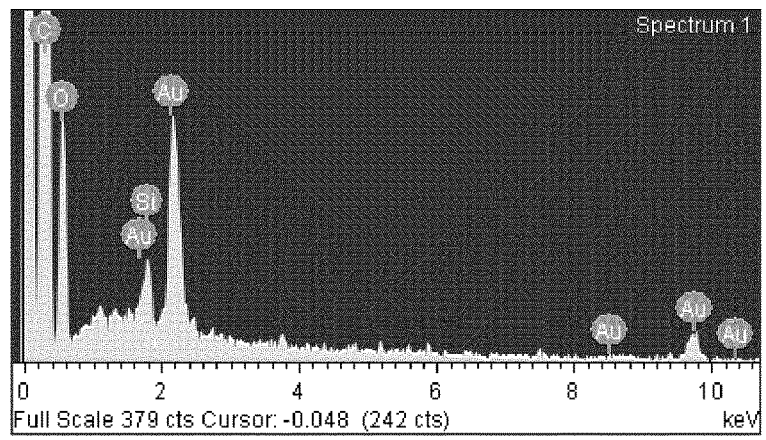
Figure 17:
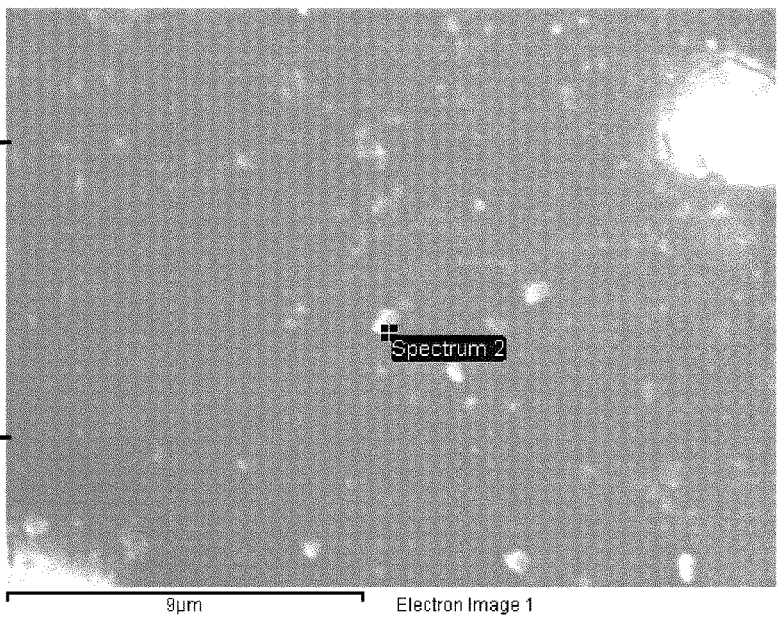
FIG. 17: Chemical analysis (Table 3 and Spectrum 2) of region of GCGPs represented in FIG. 22 and more particularly from spectrum area of SEM image (sample 24 #40-60 75% eds 2).
Figure 17:
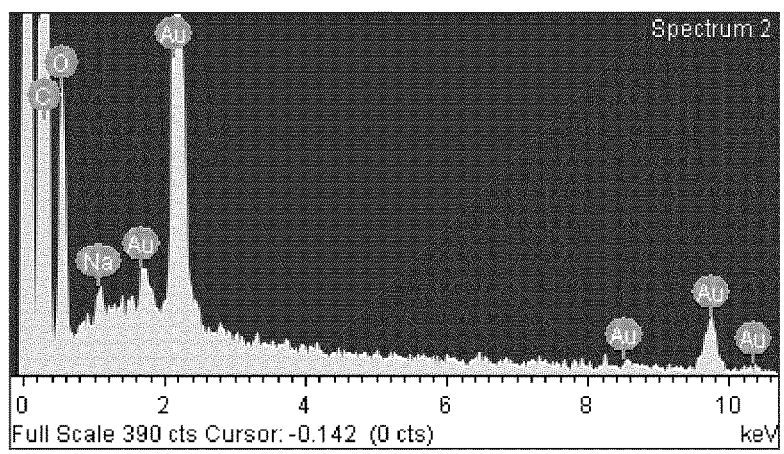
Figure 20:
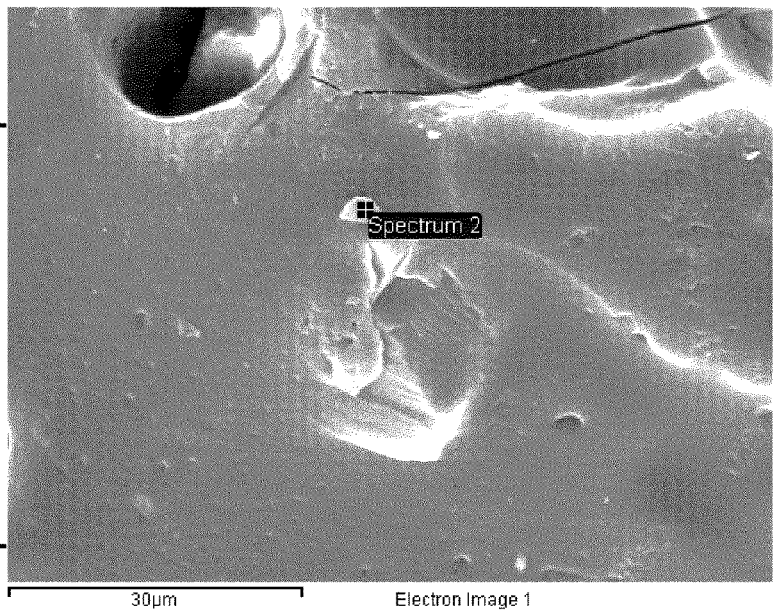
FIG. 20: Chemical analysis (Table 6 and Spectrum 2) of region of GCGPs represented in FIG. 22 and more particularly from spectrum area of SEM image (sample 24 #40-60 75% eds 6).
Figure 20:
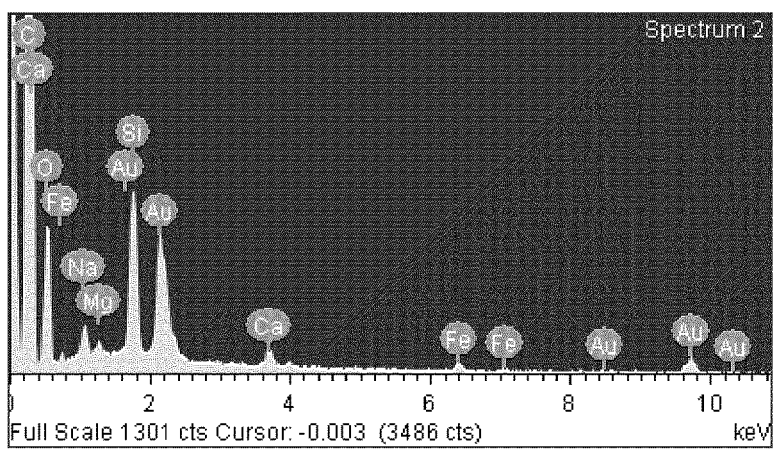

In FIG. 14, produced using a sugar to glass ratio of 150% and glass particle size of about 0.425 mm. Image A the crystallization of nano-scale carbon layers in 3D form over the base carbon coating. Image B depicts a deeper zooming of Image A.

In order to make an assessment of the stability and durability of graphene coatings formed on glass particles, the GCGPs have been washed with water and sulfuric acid, and sonicated in a 25 kHz ultrasonic bath for about 1.5 hours. The GCGPs were washed with water after sonication and the supernatant was analyzed for residual graphene using UV spectrophotometry. No free graphene was detected.

Example 2: Exemplary Protocols for Testing Adsorptive Capacity of GCGPs

There are two ways of stating adsorption capacity or performance, one through removal or conversion efficiency (percentage) as a measure of overall decontamination and one through calculating the actual maximum adsorption capacity typically in mg/g of the adsorbent.

All protocols were conducted under room temperature and under neutral pH, with no chemical addition or alteration of temperature or other environmental conditions implemented. The results generally indicate that GCGPs have an advantage compared to alternative known adsorbents as there is no requirement to change pH (through addition of chemicals) or increase temperature (consume energy) to achieve good performance in terms of the adsorption of contaminants.

Batch Testing

Several sets of batch tests were performed to evaluate GCGP performance. A 50 ml solution of hexavalent chromium at a concentration of 100 mg/L was mixed with 2 grams of GCGPs and was stirred for about two hours. The result indicated two outcomes; (1) over 97% of all hexavalent chromium was reduced to chromium (III) and 12 mg/L total chromium was removed from the solution. This indicated the capability of GCGPs to achieve chromium (VI) detoxification by converting it into chromium (III) and at the same time adsorption of total chromium at a capacity of 0.3 mg/g.

In the case of Cr VI, 97% of the toxic Cr VI was converted to Cr III. Total Cr is a combination of both Cr VI and Cr III in the solution and if we just take the total Cr, based on removal of 12 mg/L of total Cr, we can conclude that the rate of removal for total Cr has been (12)/100=0.12 or 12%, however, most of it (i.e. 97%) had been converted to non-toxic Cr III.

In these tests conducted, the initial concentration of 100 ppm for hexavalent chromium is far above the concentration ranges in real wastewaters and contaminated groundwater. A much higher adsorption capacity is anticipated for concentrations close to real conditions (generally a few ppm). It is further noted that maximum contaminant levels (MCL) for heavy metals such as Pb, Cd and Cr are set at a levels significantly below 1 ppm (Barakat et al., *Arabian Journal of Chemistry* 4 (2011) 361-377).

Another batch test was performed with 25 ml of solution containing three polycyclic aromatic hydrocarbons (PAHs) namely naphthalene, phenathren and acenaphthen at a concentration of 1 mg/L each. Two grams of GCGPs were added to the solution and the mix was stirred for 2 hrs. The PAH concentration of all three compounds were reduced to undetectable levels.

In a further batch test, different doses of GCGPs (sugar/glass ratio of 0.75 and glass particle size of 0.25 mm) were tested. The results indicated that a Freundlich isotherm was the best fit and that maximum adsorption capacity for lead was about 89 mg/g of adsorbent. Using the same kind of GCGPs, cadmium was adsorbed at a high capacity, based on the isotherm showing the best fit to Freundlich with a maximum adsorption capacity of 409 mg/g.

In yet another set of batch testing, the protocols were run for two hours assuming the reaction reached equilibrium, however, a much longer time could have been employed to achieve actual equilibrium. In all of these batch adsorption tests done on the GCGPs represented in FIG. 22, 100 ml of solution was used, spiked with about 1 mg/l of each contaminant separately. For heavy metals 0.5 g to 15 g were added to the solution and mixed for two hours. For methylene blue and organic compounds (i.e. TCE and BTEX), 0.5 g to 5 g of GCGPs were added to the solution and mixed for two hours.

Results of methylene blue adsorption tests indicated that a concentration of about 1763 ppb was decreased to about 50.8 ppb after two hours of mixing using 0.5 gram of GRAFTA. This indicates an adsorption capacity of more than 3.4 mg/g. It is worth noting that, the amount of carbon is about 3% to 5% of any one GCGP (carbon coating and glass) and therefore the actual adsorption capacity is about 85.6 mg/g assuming an average carbon content of 4% for the sample of GCGPs used Lead concentration was decreased from 850 ppb to 90 ppb using 1 g of GCGPs after two hours. Using GCGPs in excess of 3 g resulted in reducing lead concentrations from 850 ppb to non-detectable (ND) levels after two hours.

Mercury concentration was reduced from 830 ppb to an average of 50 ppb using 1 g or more of GRAFTA after two hours.

The adsorption capacity of GCGPs achieved with this set of batch adsorption testing is shown for BTEX and TCE at Table 8 of FIG. 26.

Column Testing

A main parameter to verify in column tests is the loading rate based on which desired removal efficiencies could be achieved. Exemplary target loading rates range from about 1 ml/minute to 3 ml/minute to result in a hydraulic retention time of about 1.5 hr to 0.5 hr respectively. The adsorbent density or GCGP compaction degree is set to achieve the highest possible exposure. Therefore, according to experience, GCGP material is loosely placed in the columns and confined with upper and lower perforated discs.

Column test results obtained indicated that a GCGP filtration bed is able to reduce the initial 10 ppm concentration of Pb, Cd and Cr consistently to less than 4 ppb, 8 ppb and 0.50 ppm respectively. The results were obtained using a column packed with about 200 grams of GCGPs at a loading rate of up to 5 m$^3$/day of contaminated solution. This corresponds to an adsorption capacity of about 25 mg (contaminant) per gram of GCGPs and the adsorption cycle would depend on the initial concentration of the contaminant. However, in many if not most cases, concentration of heavy metals in industrial wastewater or more importantly in groundwater is typically much lower. Therefore, if the initial concentration of a given heavy metal, for instance, was 1 ppm, time required to reach the maximum adsorption capacity would have been 80 days.

In another set of column tests, glass columns of 1.5 cm diameter and 15 cm packing height were used for testing the performance of the GCGPs represented in FIG. 22. Peristaltic pumps were used to pump solutions individually spiked with about 1 ppm (target concentration, the exact concentration is indicated for every test) at two rates of 0.3 ml/min and 3 ml/min.

Lead and mercury were tested at 0.3 ml/l and 3 ml/l influent flow rate. The initial solutions with concentrations of 290 ppb for lead and up to 1 ppm for mercury, constantly fed to the experimental columns, resulted in an effluent that contained non-detectable levels of those heavy metals. Moreover, considering the fact that, particularly for heavy metals analyzed so far in column tests (Pb and Hg), the observed ND (non-detectable) levels of metals after more than 100 pore volumes, indicates an extremely high adsorption capacity with a very limited possibility for desorption or leaching.

5048 ppb methylene blue was decreased to less than 60 ppb consistently through pore volume 1 to 110. The blue color of influent solution turned to a colorless effluent as the solution was constantly pumped through the column at a 3 ml/min rate.

A sample of contaminated groundwater from a site in Oakville, Ontario containing trichloroethylene (TCE) at a concentration of 494 microgram/l (ppb) when passed through a column packed with GCGPs at a 3 ml/min flow rate resulted in a non-detectable (ND) concentration of TCE (<0.1 ppb) from pore volume 1 to pore volume 100.

Example 3: Alternative Exemplary Protocol for Testing Adsorptive Capacity of GCGP A simple one-shot adsorption test was conducted using methylene blue, as an indicator of the adsorption capability of GCGPs. Five samples of GCGPs with varying sugar/glass ratios, with particle sizes ranging from 0.25 mm to 0.425 mm were exposed to a 114.5 µg/L solution of methylene blue and were stirred for almost 4 hours. The amount of GCGPs used was 2 g exposed to 600 ml of methylene blue solution. The results indicated that methylene blue was reduced to almost half (on an average basis) within the first 15 minutes of the test. Methylene blue concentrations as low as 12 µg/L were measured within about 90 minutes of the test.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

What is claimed is:

1. An adsorbent comprising crushed glass particles coated with graphene (GCGPs), wherein graphene outcroppings are formed from a surface of the crushed glass particles or formed from a base coating of graphene on the surface of the crushed glass particles.

2. The adsorbent of claim 1, wherein a portion of the graphene is chemically bound to the surface of the crushed glass particles.

3. The adsorbent of claim 1, wherein a silica content of the crushed glass particles ranges from about 35% to about 95% by weight.

4. The adsorbent of claim 1, wherein the crushed glass particles have a grain size ranging from about 0.01 mm to about 2 mm.

5. The adsorbent of claim 1, wherein the GCGPs further comprise graphene monolayers.

6. The adsorbent of claim 1, wherein the GCGPs further comprise graphene multilayers.

7. The adsorbent of claim 1, wherein the GCGPs comprise graphene coatings with a thickness of less than about 500 nm.

8. The adsorbent of claim 1, wherein over 50% to over 95% of a total surface of the GCGPs is coated with graphene.

9. The adsorbent of claim 1, wherein the graphene coated on the crushed glass particles comprises functionalized graphene.

10. The adsorbent of claim 1, wherein the adsorbent is a component of a filter unit.

11. A method of coating crushed glass particles with graphene to form an adsorbent, comprising the steps of mixing crushed glass particles in a sugar solution to form a mixture and heating the mixture in stages to thermally bind carbon in the form of graphene to the surface of the crushed glass particles and form GCGPs, wherein graphene outcroppings are formed from at least one of a surface of the crushed glass particles or a base coating of graphene on the surface of the crushed glass particles.

12. The method of claim 11, wherein the mixture is mixed continuously throughout all heating stages.

13. The method of claim 11, wherein the heating stages comprise a low temperature, medium temperature and high temperature heating stage.

14. The method of claim 13, wherein the high temperature heating stage is conducted at a maximum temperature in a range of about 350° C. to about 750° C.

15. The method of claim 14 wherein the high temperature heating stage is conducted at a maximum temperature of about 450° C.

16. The method of claim 13, wherein the high temperature heating stage is conducted for a period of 1 to 2 hours.

17. The method of claim 11, further comprising the steps of cooling and activating the graphene thermally bound to the crushed glass particles.

18. The method of claim 11, wherein the crushed glass particles are recycled glass.

19. A method for detoxifying a contaminated solution comprising the step of contacting the contaminated solution with an adsorbent comprising GCGPs, wherein graphene outcroppings are formed from at least one of a surface of the crushed glass particles or a base coating of graphene on the surface of the crushed glass particles, and wherein the adsorbent substantially detoxifies the contaminated solution of one or more inorganic and/or organic contaminants through adsorption onto the graphene.

20. The method of claim 19, wherein the one or more inorganic contaminants comprise heavy metals.

21. The method of claim 20, wherein the heavy metals comprise one or more of Pb, Cd, Cr and Hg.

22. The method of claim 21, wherein the Cr is in the form of Cr (VI) and is converted to Cr (III) upon contacting the adsorbent.

23. The method of claim 19, wherein the one or more organic contaminants comprise polycyclic aromatic hydrocarbons (PAHs), benzene, toluene, ethylbenzene, xylene, trichloroethylene (TCE) and/or perchloroethylene (PCE).

24. The method of claim 19, wherein the adsorbent is a component of a filter unit for ex-situ or in-situ use.

25. The adsorbent of claim 1, used as a constituent of cement-like construction materials.

26. The adsorbent of claim 1, used to remove one or more inorganic and/or organic contaminants from a contaminated solution.

27. The adsorbent of claim 1, made by a process comprising the steps of mixing crushed glass particles in a sugar solution to form a mixture and heating the mixture in stages to thermally bind carbon in the form of graphene to the surface of crushed glass particles and form GCGPs.

\* \* \* \* \*

UNITED STATES PATENT AND TRADEMARK OFFICE
CERTIFICATE OF CORRECTION

| | | |
|---|---|---|
| PATENT NO. | : 11,628,416 B2 | Page 1 of 1 |
| APPLICATION NO. | : 16/627940 | |
| DATED | : April 18, 2023 | |
| INVENTOR(S) | : Edwin Safari and Mohammed Tofigh Rayhani | |

It is certified that error appears in the above-identified patent and that said Letters Patent is hereby corrected as shown below:

On the Title Page

Item (73) Please change Assignee to: GRAFTA NANOTECH INC

Signed and Sealed this
Fifteenth Day of August, 2023

Katherine Kelly Vidal
*Director of the United States Patent and Trademark Office*